US012701092B2

(12) United States Patent
Asai et al.

(10) Patent No.: US 12,701,092 B2
(45) Date of Patent: Aug. 4, 2026

(54) TRANSMISSION DEVICE, RECEPTION DEVICE, TRANSMISSION METHOD, RECEPTION METHOD, AND MOVABLE ENTITY

(71) Applicant: TOYOTA JIDOSHA KABUSHIKI KAISHA, Toyota (JP)

(72) Inventors: Hirochika Asai, Chiyoda-ku (JP); Ryokichi Onishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 18/253,805

(22) PCT Filed: Nov. 22, 2021

(86) PCT No.: PCT/JP2021/042805
§ 371 (c)(1),
(2) Date: May 22, 2023

(87) PCT Pub. No.: WO2022/113933
PCT Pub. Date: Jun. 2, 2022

(65) Prior Publication Data
US 2024/0007420 A1 Jan. 4, 2024

(30) Foreign Application Priority Data
Nov. 24, 2020 (JP) ................................. 2020-194635

(51) Int. Cl.
*H04L 49/90* (2022.01)
*H04L 49/9057* (2022.01)

(52) U.S. Cl.
CPC ................................ *H04L 49/9057* (2013.01)

(58) Field of Classification Search
CPC ..................................................... H04L 49/9057
See application file for complete search history.

(56) References Cited

U.S. PATENT DOCUMENTS 10,368,229 B2 * 7/2019 Fujinami ............. H04W 88/005
10,619,472 B2 * 4/2020 Harris ..................... E21B 47/00
(Continued)

OTHER PUBLICATIONS

International Preliminary Report on Patentability, PCT/JP2021/042805 mailed Jun. 8, 2023.
(Continued)

*Primary Examiner* — Henry Tsai
*Assistant Examiner* — Christopher A Daley
(74) *Attorney, Agent, or Firm* — Finnegan, Henderson, Farabow, Garrett, and Dunner, LLP

(57) ABSTRACT

A disclosure is provided to suppress a load of transmission processing or reception processing in a case where data pieces of a plurality of applications are transmitted or received in a single packet. A transmission device of the discloser comprises: a first writer configured to read, from a transmission buffer configured to store first data related to a first application, the first data, and to write the first data that is read to a first memory region; and a packet generator configured to read, in a case where a transmission request of second data related to a second application is generated after the first data is written to the first memory region, the first data in the first memory region, and to generate a packet containing the first data and the second data.

12 Claims, 23 Drawing Sheets

(56) References Cited

U.S. PATENT DOCUMENTS

| | | | |
|---|---|---|---|
| 10,719,472 B2 * | 7/2020 | Lee ..................... | G06F 13/4282 |
| 10,785,271 B1 * | 9/2020 | Gunnalan ............... | H04L 65/65 |
| 11,128,740 B2 * | 9/2021 | Foo ....................... | H04L 69/324 |
| 2011/0238869 A1 * | 9/2011 | Fredriksen ............ | G06F 13/385 |
| | | | 710/104 |
| 2013/0077632 A1 * | 3/2013 | Ishiguro ............... | H04L 65/765 |
| | | | 370/394 |
| 2014/0006481 A1 | 1/2014 | Frey et al. | |
| 2017/0265103 A1 * | 9/2017 | Kobayashi ............ | H04L 69/161 |

OTHER PUBLICATIONS

Rizzo, "Netmap: a novel framework for fast packet I/O," In 21$^{st}$ USENIX Security Symposium (USENIX Security 12), 2012, pp. 101-112.
He et al., "AIDA: Adaptive Application Independent Data Aggregation in Wireless Sensor Networks," ACM Transaction on Embedded Computing System, col. 3, issue 2, May 1, 2004, pp. 1-22.

* cited by examiner

129

229

229

TRANSMISSION DEVICE, RECEPTION DEVICE, TRANSMISSION METHOD, RECEPTION METHOD, AND MOVABLE ENTITY

CROSS REFERENCE TO RELATED APPLICATIONS

This application is a national stage of International Application No. PCT/JP2021/042805, filed Nov. 22, 2021, and is based upon and claims the benefit of priority from the prior Japanese Patent Application No. 2020-194635, filed on Nov. 24, 2020, the entire contents of which are incorporated herein by reference.

FIELD

The present disclosure relates to a transmission device, a reception device, a transmission method, a reception method, and a movable entity.

BACKGROUND

In a packet switching scheme, a series of data is divided into packets to be transmitted from a transmission device to a reception device. Network interface cards (NICs), which are included in the transmission device and the reception device, are implemented with a FIFO buffer called a ring buffer that holds a structure called a descriptor in a ring shape in many cases. The descriptor is information describing a pointer pointing to a memory region in which a packet is to be stored, a packet size, or the like. At the time of packet reception, the packet is written from the NIC to the memory region designated by the descriptor by way of a direct memory access (DMA). At the time of packet transmission, the packet in the memory region designated by the descriptor is transferred from the memory to the NIC by way of the DMA, and the packet is transmitted from the NIC.

When data is transmitted or received in an application, packetization or reassembly is normally performed in a kernel of an operating system (Operating System: OS). The packetization is performed by copying a part of a series of data (for example, a datagram or a segment) in a memory region designated by a descriptor. In addition, for the reassembly too, by copying a received packet in continuous memory regions, the packet is to be dealt with from the application as the series of data. Since this copying processing generally causes a high load on a CPU, a technology has been also proposed with which by directly operating the memory region to be designated by the descriptor from the application, the copying processing by the CPU is to be eliminated to aim for low latency and speeding-up.

However, in a case where data pieces of a plurality of applications are to be assembled into a single packet or a case where data pieces of a plurality of applications that are contained in a single packet are to be reassembled for each application, it is not easy to reduce the copying processing.

CITATION LIST

Non Patent Literature

[Non Patent Literature 1] Rizzo, Luigi. "Netmap: a novel framework for fast packet I/O." In 21st USENIX Security Symposium (USENIX Security 12), pp. 101-112. 2012. Harvard

Problem to be Solved

The present disclosure provides a transmission device, a reception device, a transmission method, a reception method, and a movable entity in which a load of transmission processing or reception processing in a case where data pieces of a plurality of applications are transmitted or received in a single packet is suppressed.

SUMMARY

A transmission device of the present discloser comprises: a first writer configured to read, from a transmission buffer configured to store first data related to a first application, the first data, and to write the first data that is read to a first memory region; and a packet generator configured to read, in a case where a transmission request of second data related to a second application is generated after the first data is written to the first memory region, the first data in the first memory region, and to generate a packet containing the first data and the second data.

A movable entity of the present discloser comprises: a first sensor configured to detect the first data; a second sensor configured to detect the second data; and the transmission device.

A reception device of the present discloser comprises: a buffer manager configured to allocate, in a case where a packet containing first data and second data is received, a first buffer to the packet; a packet processor configured to write the first data and the second data that are contained in the packet to the first buffer; a first reader configured to read the first data from the first buffer, and to output the first data to a first application; a writer configured to read, after the first data is read from the first buffer, the second data from the first buffer, and to write the second data to a reception buffer; and a second reader configured to read the second data from the reception buffer, and to output the second data to a second application.

A reception device of the present discloser comprises: a buffer manager configured to allocate, in a case where a packet containing first data and second data is received, a first buffer to the first data, and to allocate a second buffer to the second data; a packet processor configured to write the first data to the first buffer, and to write the second data to the second buffer; a first reader configured to read the first data from the first buffer, and to output the first data to a first application; a writer configured to read the second data from the second buffer, and to write the second data to a reception buffer; and a second reader configured to read the second data from the reception buffer, and to output the second data to a second application.

A transmission method comprises: reading, from a transmission buffer configured to store first data related to a first application, the first data, and writing the first data that is read to a first memory region; reading, in a case where a transmission request of second data related to a second application is generated after the first data is written to the first memory region, the first data in the first memory region, and generating a packet containing the first data and the second data; and transmitting the packet.

DETAILED DESCRIPTION

Figure 1:
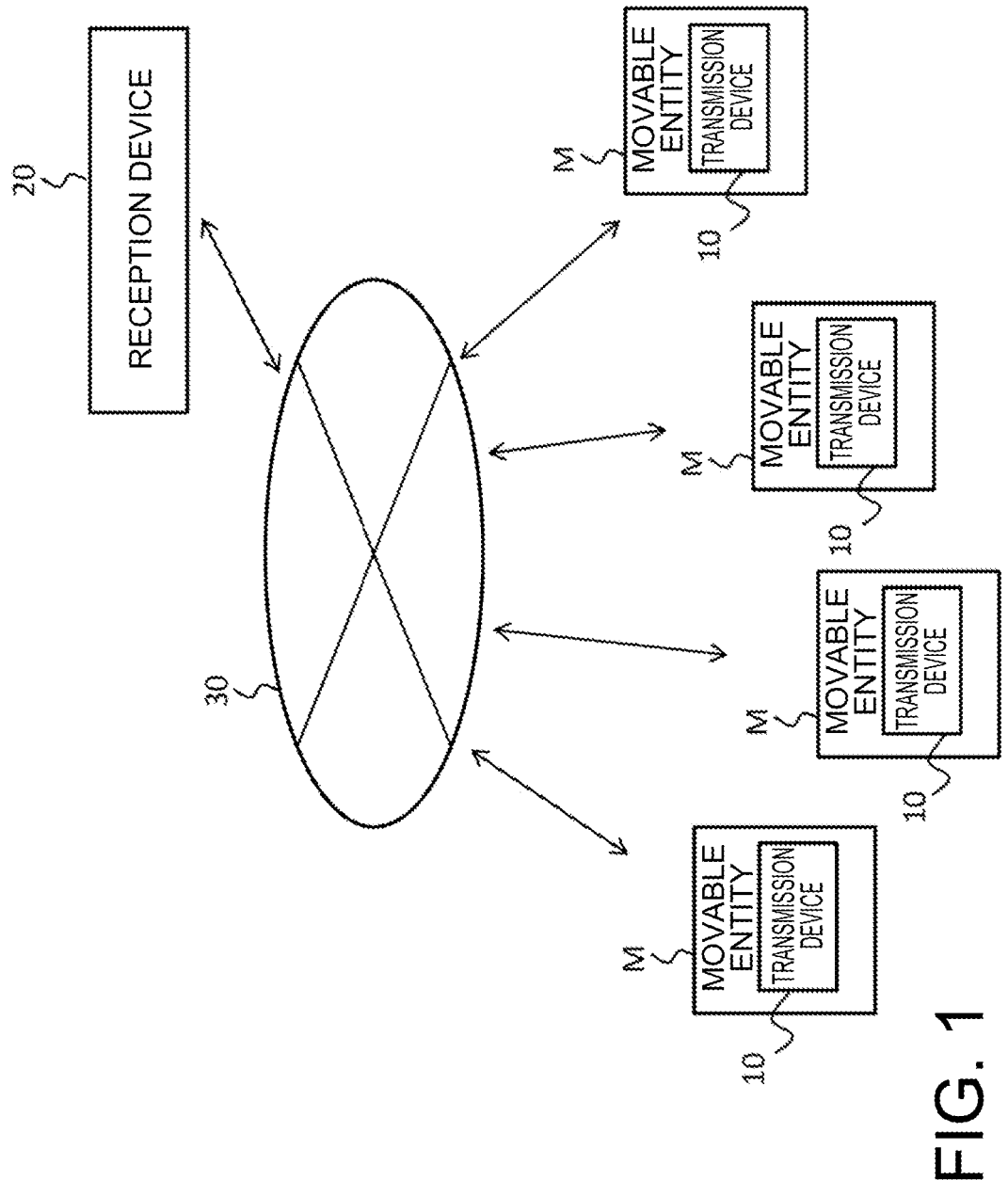
FIG. 1 is a block diagram of a communication system according to the present embodiment.

Hereinafter, embodiments of the present disclosure will be described with reference to the drawings. The drawings schematically illustrate the embodiments of the present disclosure as an example, and the embodiments of the present disclosure are not limited to modes disclosed in the drawings. A same reference sign is assigned to a same element in a plurality of drawings, and descriptions of already explained elements will be accordingly omitted.

First Embodiment

FIG. 1 is a block diagram of a communication system according to the present embodiment. The communication system in FIG. 1 includes a plurality of movable entities M having a transmission device 10 mounted thereto, and a reception device 20. The transmission device 10 and the reception device 20 are equivalent to an example of a communication device or a wireless communication device according to the present embodiment.

The movable entity M is any movable entity such as an automobile, a robot, a marine vessel, a drone, a mobile terminal (a smartphone, a tablet terminal, or the like), or a train. According to the present embodiment, the transmission device 10 is mounted to the movable entity, but the transmission device 10 may be mounted to a terminal or machine that is fixedly installed. According to the present embodiment, a case is assumed where the movable entity M is an automobile. The automobile may be any of an automobile having a function of assisting driving by a user and an automated driving vehicle that autonomously carries out determinations to travel.

The transmission device 10 is connected to a communication network 30. As an example, the communication network 30 is a network such as a mobile network or a wireless LAN (Local Area Network). Examples of the mobile network include a 3G network, an LTE network, a new generation (5G) network, and the like, but any type of networks may be used. In addition, the communication network 30 may be a wireless network or a wired network. The communication network 30 may include a plurality of types of networks. In this case, the transmission device 10 may choose a network to be used for communication with the reception device 20 from among the plurality of types of networks. According to the present embodiment, the transmission device 10 performs wireless communication, but may be configured to perform wired communication. The communication network 30 may include one or more relay devices that relay data or a packet.

The transmission device 10 acquires data from one or a plurality of sensors provided in the movable entity M. The one or the plurality of sensors may be provided in a terminal or machine that is fixedly installed. The one or the plurality of sensors detect data to be provided to one or a plurality of applications in the reception device. The data detected by the plurality of sensors is data of mutually different applications. The data of the plurality of applications belongs to mutually different data flows. The transmission device 10 transmits the data detected by each sensor to the reception device 20. In more detail, the transmission device 10 generates a packet containing data of one or a plurality of sensors (data of one or a plurality of applications), and transmits the generated packet to the reception device 20. Examples of the plurality of sensors include a camera, GPS, LiDAR (Light Detecting And Ranging), a speed sensor, an acceleration sensor, a detection sensor of control information (such as an engine rotating status or an accelerator depressing status) for an automobile, a sudden brake detecting sensor, an obstacle (a falling object or a preceding vehicle) detecting sensor, and the like. The examples of the sensors are not limited to the above mentioned ones. For example, the sensor may be a sensor that detects data input from a user such as an occupant of the automobile via an operation unit.

The reception device 20 is connected to the communication network 30 in a wired or wireless manner. The reception device 20 is arranged in a mobile network, for example. The reception device 20 may be an edge controller of the mobile network. The reception device 20 receives a packet containing data for one or a plurality of applications from the transmission device 10. The reception device 20 includes one or a plurality of applications configured process data transmitted from the transmission device 10. The reception device 20 delivers each data acquired from the transmission device 10 to corresponding applications.

Examples of the plurality of applications include an application configured to generate a high definition map, an application configured to generate an optimization model for engine control, an application configured to generate road safety information, and the like. Depending on applications, a time constraint for data transmission, that is, a time constraint for providing data to an application may be varied. As an example, in the application configured to generate the high definition map and the application configured to generate the optimization model for the engine control, the time constraint for the data transmission is long (one hour, one day, or the like). On the other hand, in the application configured to generate the road safety information, the time constraint for the data transmission is short (for example, ten seconds or less, or the like). As an example, data with a short time constraint corresponds to data with a high priority, and data with a long time constraint corresponds to data with a low priority.

The reception device 20 may function as a relay device. In this case, the reception device 20 may transmit the data received from the transmission device 10 to another device (for example, a server) that includes one or a plurality of applications.

The transmission device 10 and the reception device 20 may communicate with each other via a relay device such as a base station or a router. For example, by executing a predetermined connection process, the transmission device 10 is wirelessly connected to a nearby base station. The transmission device 10 communicates with the reception device 20 via the connected base station. One or more routers may be arranged between the base station and the reception device 20. The reception device 20 may be connected to the base station in a wireless or wired manner. The reception device 20 may be connected to a plurality of base stations, or connected to the base station one-to-one.

Figure 2:
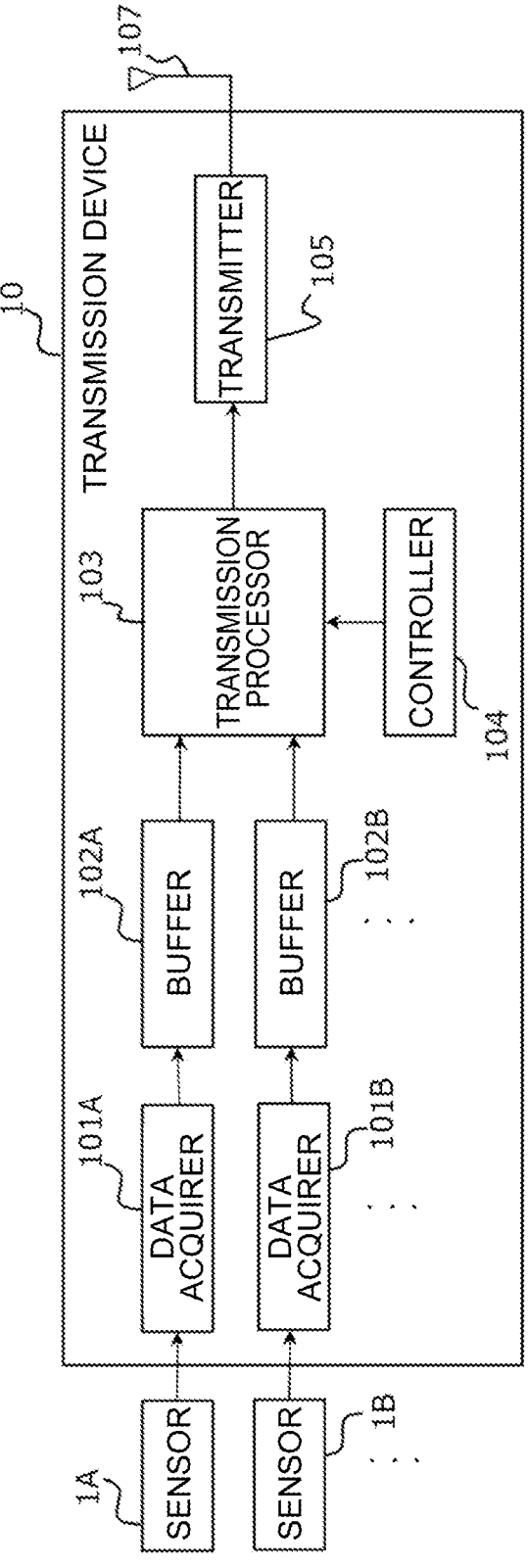
FIG. 2 is a block diagram of a transmission device according to the present embodiment.

FIG. 2 is a block diagram of the transmission device 10. The transmission device 10 is equivalent to an example of the communication device or the wireless communication device according to the present embodiment.

The transmission device 10 includes a plurality of data acquirers 101A and 101B, a plurality of buffers 102A and 102B, a transmission processor 103, a controller 104, a transmitter 105, and at least one antenna 107. The transmission device 10 may include a part to be connected in a wired manner in addition to the antenna 107, or may include a part to be connected in a wired manner as a substitute for the antenna 107.

In the example of FIG. 2, two data acquirers are provided, but three or more data acquirers may be provided. Similarly, two buffers are provided, but three or more buffers may be provided. One pair of the transmitter and the antenna is provided, but two or more pairs thereof may be provided.

The data acquirers 101A and 101B are respectively connected to the sensors 1A and 1B. The sensor 1A detects data to be provided to an application A. The sensor 1B detects data to be provided to an application B. Two sensors are provided in the example of FIG. 2, but three or more sensors may be provided.

Examples of the plurality of sensors include a camera, GPS, a sensing sensor (LiDAR (Light Detecting And Ranging) of travelling information of the automobile, a speed sensor, an acceleration sensor, a detection sensor of control information (such as an engine rotating status or an accelerator depressing status) for the automobile, a sudden brake detecting sensor, an obstacle (a falling object or a preceding vehicle) detecting sensor, and the like. The sensor may be a sensor that outputs data at regular intervals in time series, or may be a sensor that outputs data at specific timing such as timing at which an event has occurred. The examples of the sensors are not limited to the above mentioned ones. For example, the sensor may be a sensor that detects data input from a user such as an occupant of the automobile via an operation unit.

The data detected from each sensor at regular intervals or at specific timing respectively serves as each data to be provided to the applications.

The data acquirers 101A and 101B acquire data detected by the sensors 1A and 1B. The data detected by the sensor 1A will be referred to as data A, and the data detected by the sensor 1B will be referred to as data B. A case is assumed where the data A is data of an application with a long time constraint as an example, and the data B is data of an application with a short time constraint as an example. The data acquirers 101A and 101B provide the acquired data A and B to the buffers 102A and 102B. The data detected by the sensor includes, for example, attribute information of the sensor, a detection clock time, and a payload.

The buffers 102A and 102B receive the data A and B from the data acquirers 101A and 101B, and store therein the received data A and B. That is, the buffers 102A and 102B buffer the data A and B acquired from the data acquirers 101A and 101B. The buffer 102A manages an order of reception of the data A, and outputs the data A in the order of reception. The buffer 102B manages an order of reception of the data B, and outputs the data B in the order of reception. The buffers 102A and 102B are configured by a recording medium such as a memory device or a hard disc as an example.

The controller 104 controls read and transmission of the data from the buffers 102A and 102B. As an example, the controller 104 controls read of the data from the buffers 102A and 102B according to the time constraints of the applications. The controller 104 provides a transmission request of the data A and a transmission request of the data B to the transmission processor 103.

Under the control of the controller 104, the transmission processor 103 reads the data A and B from the buffers 102A and 102B to generate a packet containing the read data A and B (packet in which the data A and B are multiplexed). As an example, in the transmission processor 103, IP (Internet Protocol), UDP (Internet Protocol) or TCP (Internet Protocol) processing is performed, and processing of at least one of an upper protocol and a lower protocol is further performed. When both the data pieces are to be multiplexed, a common UDP header or TCP header may be added to both the data A and B, or a UDP header or a TCP header may be respectively independently added to the data A and B, and both the data pieces may be multiplexed into a single packet. A protocol for multiplexing at least one of UDP datagrams and TCP segments may be introduced as an upper layer of UDP or TCP. According to the present embodiment, any method may be used as long as data pieces of a plurality of applications can be multiplexed into a single packet.

The transmitter 105 communicates with the reception device 20 via the communication network 30. The transmitter 105 performs processing of a lower layer protocol on the packet provided from the transmission processor 103, and transmits the packet after the processing via the antenna 107. In more detail, the transmitter 105 modifies and digital-to-analog converts the packet after the processing into an analog signal, and performs extraction of a signal in a desired band and up-conversion of the extracted signal to a radio frequency. The transmitter 105 amplifies the signal at the radio frequency by using an amplifier or the like, and transmits the amplified signal at the radio frequency via the antenna 107. The processing of the lower layer protocol includes processing at a data link layer and a physical layer as an example. The data link layer includes a protocol of Ethernet (registered trademark) or IEEE802.11 as an example. The processing of at least one of the data link layer and the physical layer may be performed by the transmission processor 103.

Figure 3:
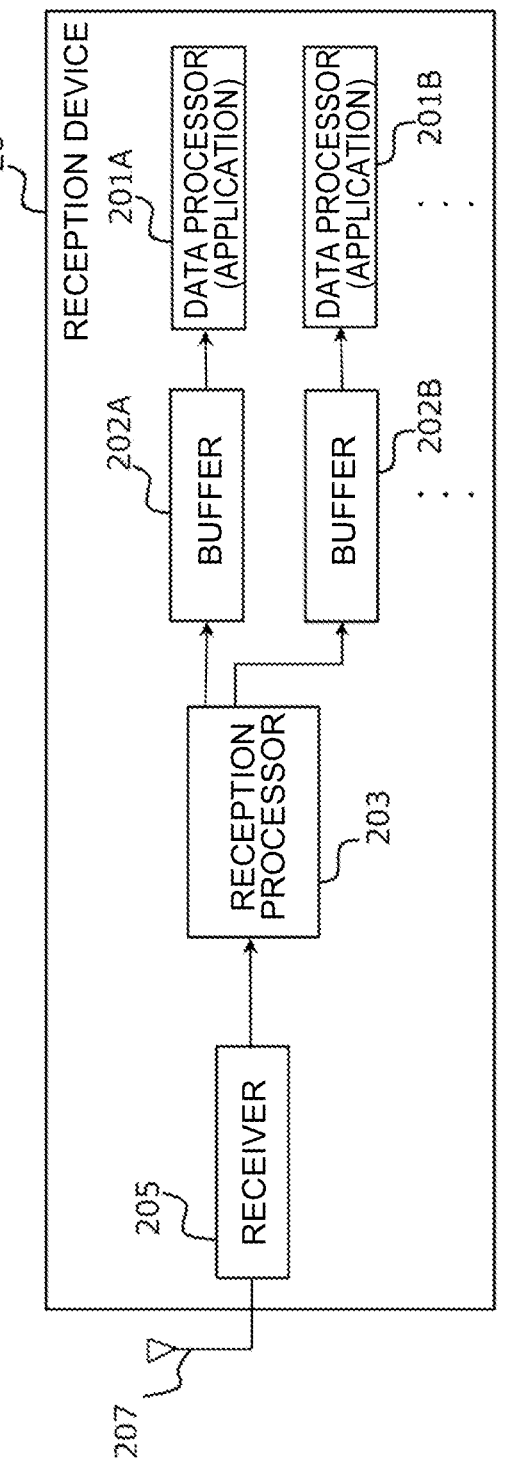
FIG. 3 is a block diagram of a reception device according to the present embodiment.

FIG. 3 is a block diagram of the reception device 20. The reception device 20 includes data processors (applications) 201A and 201B, buffers 202A and 202B, a reception processor 203, a receiver 205, and an antenna 207. The reception device 20 is equivalent to an example of the wireless communication device or the communication device according to the present embodiment. According to the present embodiment, the reception device 20 performs wireless communication, but a configuration in which wired communication is performed is not excluded.

Two data processors are provided in the example of FIG. 3, but three or more data processors may be provided. Similarly, two buffers are provided, but three or more buffers may be provided. In addition, one pair of the receiver and the antenna is provided, but two or more pairs thereof may be provided.

The receiver 205 receives a packet transmitted from the transmission device 10 via the communication network 30. In more detail, the receiver 205 receives a radio signal via the antenna 207 and amplifies the received signal to be down-converted to a baseband frequency. The receiver 205 extracts a signal in a desired band from the down-converted signal, and analog-to-digital converts the extracted signal. The receiver 205 demodulates the digital signal acquired by the analog-to-digital conversion. The receiver 205 performs processing of a lower layer protocol on the demodulated packet, and provides the packet after the processing to the reception processor 203.

The reception processor 203 performs processing of a protocol that is upper than the above mentioned lower layer, and separates the data A and the data B from the packet. The reception processor 203 provides the data A to the buffer 202A, and provides the data B to the buffer 202B.

The buffers 202A and 202B store therein the data provided from the reception processor 203. That is, the buffers 202A and 202B buffer the data provided from the reception processor 203. The buffers 202A and 202B output the buffered data in the order of reception. A scheme in which the data is to be output from the buffers 202A and 202B may be varied according to types of output data. As an example, the buffers 202A and 202B may output the data in response to requests from the data processors 201A and 201B. Alternatively, the buffers 202A and 202B may output the data immediately after the data is input. Alternatively, the buffers 202A and 202B may output the buffered data in regular time interval. The buffers 202A and 202B are configured by a recording medium such as a memory device or a hard disc as an example.

The data processors 201A and 201B are application executors configured to process the data provided from the buffers 202A and 202B by respectively executing the applications. As an example, the data processor 201A includes the application A and a CPU, and the CPU executes the application A. As an example, the data processor 201B includes the application B and a CPU, and the CPU executes the application B. Examples of the applications include generation of a high definition map, generation of an optimization model for engine control, generation of road safety information, and the like, but these are merely examples, and various other applications have been proposed.

Figure 4:
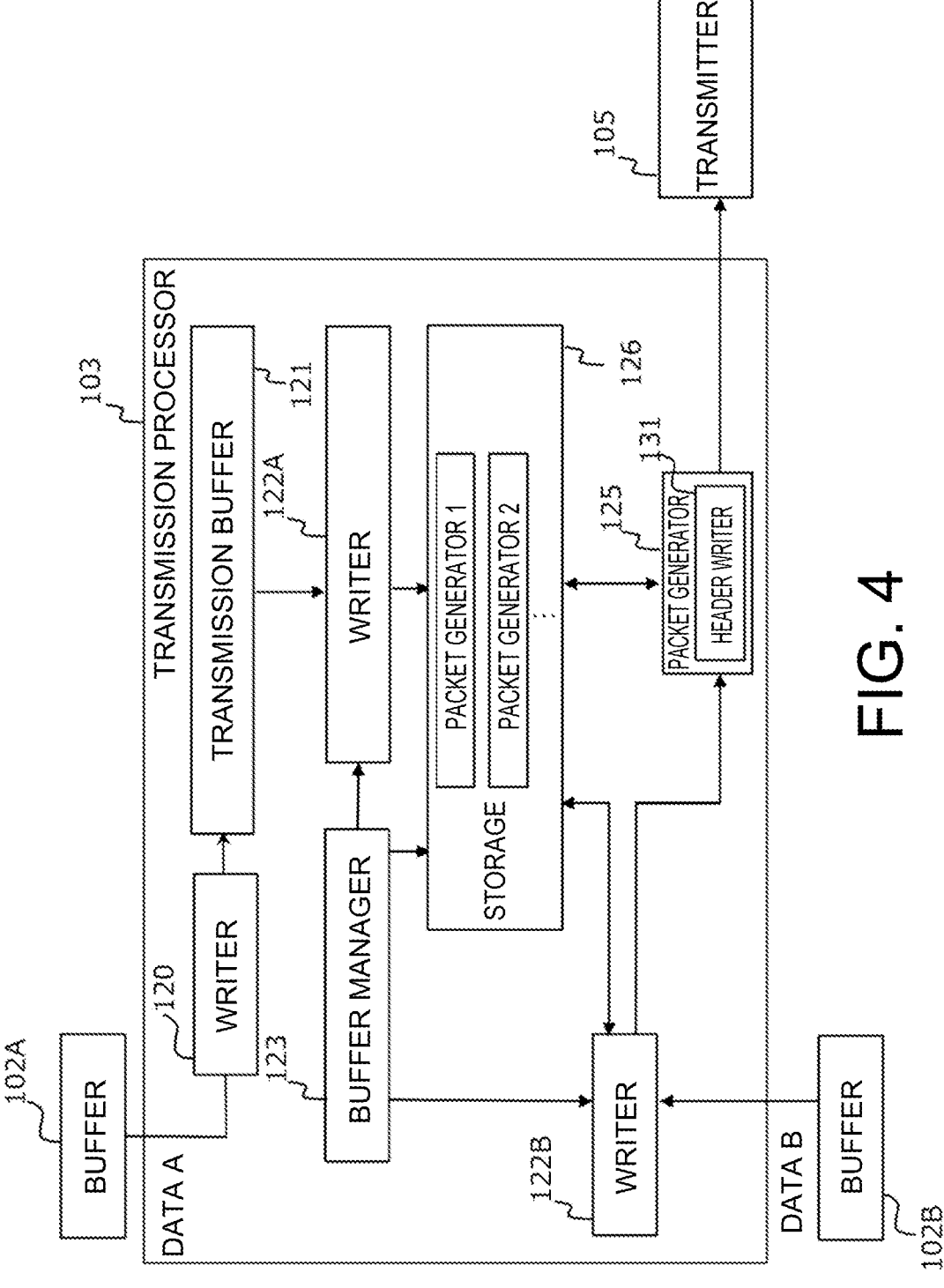
FIG. 4 is a detailed block diagram of a transmission processor in the transmission device according to the present embodiment.

FIG. 4 is a detailed block diagram of the transmission processor 103. The transmission processor 103 includes a writer 120 (third writer), a transmission buffer 121, a writer 122A (first writer), a writer 122B (second writer), a buffer manager 123, a packet generator 125, and a storage 126 (memory device). The transmission buffer 121 and the storage 126 are configured by a recording medium such as a memory. The memory may be a volatile memory, a non-volatile memory, or both of these. The transmission buffer 121 and the storage 126 may be a same recording medium or separate recording media. Processing of the writer 120, the writer 122A, the writer 122B, the buffer manager 123, and the packet generator 125 is executed by a processor such as a CPU (Central Processor) as an example. As an example, all or a part of the processing of the writer 122A, the buffer manager 123, and the packet generator 125 is executed by an OS (Operating System), and all or a part of the processing of the writer 120 and the writer 122B is executed by an application for data transmission. An application of the writer 120 and an application of the writer 122B may be the same or may be different from each other.

The transmission buffer 121 is a storage region (for example, a memory region) with a predetermined size. Each time the data A is input from the buffer 102A, the writer 120 writes the data A to the transmission buffer 121. The data A is sequentially stored in the transmission buffer 121. The data A is stored in sequence from a predetermined address in the transmission buffer 121. The transmission buffer 121 is configured by a FIFO buffer as an example.

At the time of initialization of the transmission processor 103, the buffer manager 123 reserves (generates), in the storage 126, a memory region in which a descriptor is stored. The memory region for the descriptor is configured by a ring buffer as an example.

In addition, in response to a request from the writer 122A, the buffer manager 123 allocates (generates) one or more packet buffers (first buffers) serving as memory regions to the storage 126. The packet buffer has a memory region with a size equal to or larger than a size of the packet generated by the transmission processor 103. The packet buffer has a set size as an example. It is noted that the buffer manager 123 may generate a predetermined number (one or more) of the packet buffers in the storage 126 in advance.

Figure 5:
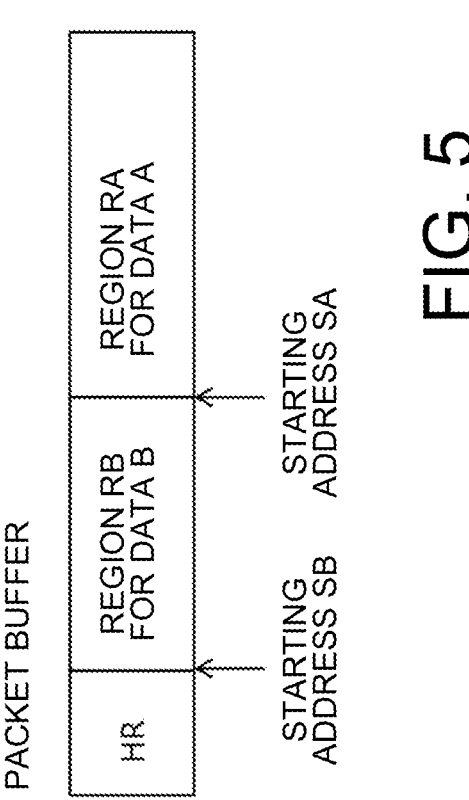
FIG. 5 illustrates a configuration example of a packet buffer.

FIG. 5 illustrates a configuration example of the packet buffer. The packet buffer has a memory region HR for the header, a region RB (second memory region) for the data B, and a region RA (first memory region) for the data A. The region RA for the data A starts from a starting address SA, and the region for the data B starts from a starting address SB. The region RA for the data A may be located before the region RB for the data B. The region RB for the data B has a size according to a maximum size of the data B as an example. The region RA for the data A is decided according to the size of the region RB for the data B, a size of the region HR for the header, and a maximum size of the packet as an example.

The buffer manager 123 manages the packet buffer by a buffer identifier and a descriptor corresponding to the buffer identifier. As an example, the descriptor has various attributes such as an address (pointer) of the packet buffer, a size of the stored data, an identifier of the application, the starting address SB, and the starting address SA. The descriptor is managed by a ring buffer as an example.

In a case where the data A is stored in the transmission buffer 121, the writer 122A reads, from a head side, the data A that has not been read yet out of the data A stored in the transmission buffer 121. The writer 122A writes (stores) the read data A from the starting address SA in the packet buffer based on information of the descriptor. The starting address SA may be designated by the application. A size of the data A to be read from the transmission buffer 121 is equal to or smaller than the region RA for the data A. It is noted that a size of the data A to be written to the transmission buffer 121 (read from the buffer 202A) and the size of the data A read from the transmission buffer 121 (written to the packet buffer) do not necessarily need to be the same. In a case where the data A remains in the transmission buffer 121, until the number of packet buffers reaches a threshold (an integer equal to or larger than 1), the packet buffer may be generated, and the data A may be read from the transmission buffer 121 to be written to the generated packet buffer. It is noted that in a case where processing of a protocol that is independent from the data B needs to be performed on the data A, the writer 122A may perform the processing of the protocol on the data A to be then written to the packet buffer.

When the data B is input from the buffer 102B, the writer 122B acquires, from the buffer manager 123 or the writer 122A, information of a descriptor related to a packet buffer to which the data B is to be written. The packet buffer to which the data B is to be written is the packet buffer to which the data A has been already written. The writer 122B specifies the starting address SB of the packet buffer based on information of the descriptor. The starting address SB may be designated by the application. The writer 122B writes the data B from the starting address SB of the packet buffer. The write by the writer 122B is performed by way of the DMA (Direct Memory Access) as an example. A size of the data B to be written is equal to or smaller than the size of the region RB for the data B. When the write of the data B is completed, the writer 122B provides the packet generator 125 with information of the descriptor related to the packet buffer to which the data B has been written. That is, notification information indicating the completion of the write of the data B to the packet buffer or a transmission request of the packet is transmitted to the packet generator 125. It is noted that in a case where processing of a protocol that is independent from the data A is performed on the data B, the writer 122B may perform the processing of the protocol on the data B to be then written to the packet buffer.

When the notification information indicating the completion of the write of the data B to the packet buffer is received (when the transmission request of the data B is generated), the packet generator 125 accesses a file descriptor corresponding to the packet buffer. The packet generator 125 generates a header based on the information of the data A and the data B that is stored in the packet buffer. A header writer 131 of the packet generator 125 writes the generated header to a region HR for the header in the packet buffer.

A size of the header may be the same as that of the region HR for the header or may be smaller than that of the region HR for the header. For example, the size of the region HR for the header may have some margin to be able to deal with a plurality of types of headers or a header with a variable length. The header is stored to be aligned to a tail address side (aligned to the right along a plane of paper) to be adjacent to the region RB for the data B. It is noted however that the header may be stored from a head address of the region HR for the header (aligned to the left along a plane of paper).

The packet generator 125 reads all the data in the packet buffer from the header to the tail address of the packet buffer to generate a packet. That is, the header stored in the region HR, all the data in the region RB for the data B, and all the data in the region RA for the data A are combined to generate the packet. The read by the packet generator 125 is performed by way of the DMA as an example. In a case where a region in which the data B is not stored exists in the region RB, all the data in the region RB for the data B includes data in the region. In a case where a region in which the data A is not stored exists in the region RA, all the data in the region RA for the data A includes data in the region. According to a type of a protocol to be processed by the transmission processor 103, an error detecting code (FCS or CRC) or the like may be further added to the tail of the packet, or the packet may be encoded by using an error correcting code.

The packet generator 125 includes, in the header, location information A (first location information) indicating a location where the data A is stored and location information B (second location information) indicating a location where the data B is stored. The location information A includes, for example, a start byte location and an end byte location of a range in which the data A is contained in the packet. Alternatively, the location information A includes the start byte location of the range in which the data A is contained in the packet and size information of the data A. The location information A can be calculated based on the range in which the data A is stored out of the region RA for the data A. Similarly, the location information B includes a start byte location and an end byte location of a range in which the data B is contained in the packet. Alternatively, the location information B includes the start byte location of the range in which the data B is contained in the packet and size information of the data B. The location information B can be calculated based on the range in which the data B is stored out of the region RB for the data A.

Information indicating the address range in which the data B is stored, the data size, the region RB for the data B, the address range in which the data A is stored, the data size of the data A, and the region RA for the data A may be included in the descriptor of the packet buffer. The packet generator 125 may generate a header of the packet by using these pieces of information included in the descriptor.

The packet generator 125 provides the generated packet to the transmitter 105. The transmitter 105 performs processing of a lower layer protocol on the packet, and transmits the packet after the processing via the antenna 107.

After the data is read from the packet buffer, the buffer manager 123 may delete the packet buffer or may reuse the packet buffer for generation of another packet.

Figures 6A, 6B, 6C:
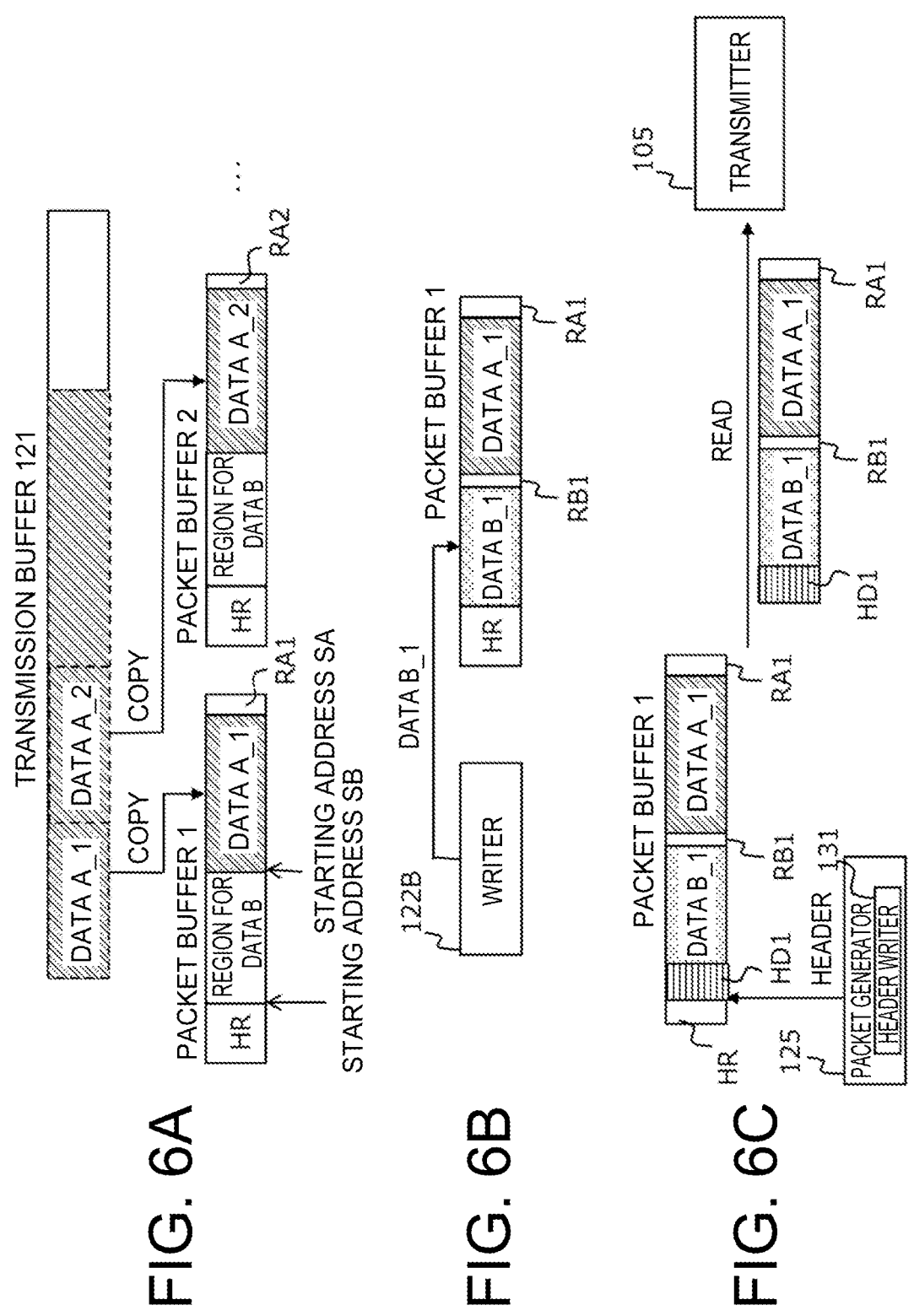
FIG. 6 illustrate examples of an operation of generating a packet according to a first embodiment.

FIG. 6A to FIG. 6C illustrate examples of an operation of generating a packet. In FIG. 6A, first, data A (denoted as data A_1) is written to the transmission buffer 121, and subsequently, data A (denoted as data A_2) is written thereto for the second write. The data A_1 is read from the transmission buffer 121, and the data A_1 is written from a starting address SA of a packet buffer 1. In other words, the data A_1 is copied from the transmission buffer 121 to the packet buffer 1. Data of a remaining region RA1 in which the data A is not stored out of the region RA for the data A may be optional. After the data A_1 is read, the data A_2 is read from the transmission buffer 121, and the data A_2 is written from a starting address SA of a packet buffer 2. In other words, the data A_2 is copied from the transmission buffer 121 to the packet buffer 2. Data of a remaining region RA2 in which the data A is not stored out of the region RA for the data A may be optional. In a case where the data A that has not been read to the transmission buffer 121 exists, and third and subsequent packet buffers can be generated, similarly, the data A may be written to the third packet buffer 3 too. The packet buffers are used in the order of generation for the processing for the write of next data B.

Next, in FIG. 6(B), data B (denoted as data B_1) is input to the writer 122B. The writer 122B receives information (descriptor of the packet buffer 1) for designating the first generated packet buffer 1 from the buffer manager 123. The writer 1228 writes the data B_1 from the starting address SB of the packet buffer 1. Data of a remaining region RB1 in which the data B_1 is not stored out of the region RB for the data B may be optional.

Next, in FIG. 6(C), the packet generator 125 generates a header (denoted as HD1) based on information of the data B_1 and the data A_1 of the packet buffer 1. The packet generator 125 may generate the header HD1 based on the information of the descriptor. The header writer 131 of the packet generator 125 writes the header HD1 to the region HR for the header in the packet buffer 1.

The packet generator 125 reads, from the packet buffer 1, all the data from the header HD1 onwards that is included in the packet buffer 1, and provides a packet based on the read data to the transmitter 105.

Thereafter, in a case where next data B (denoted as data B_2 that is not illustrated in the drawing) is input from the buffer 102B, a packet is generated by using the packet buffer 2 in which the data A_2 is stored. Since a detail of the packet generation is the same as that in a case where the packet buffer 1 is used, a description thereof will be omitted.

Figure 7:
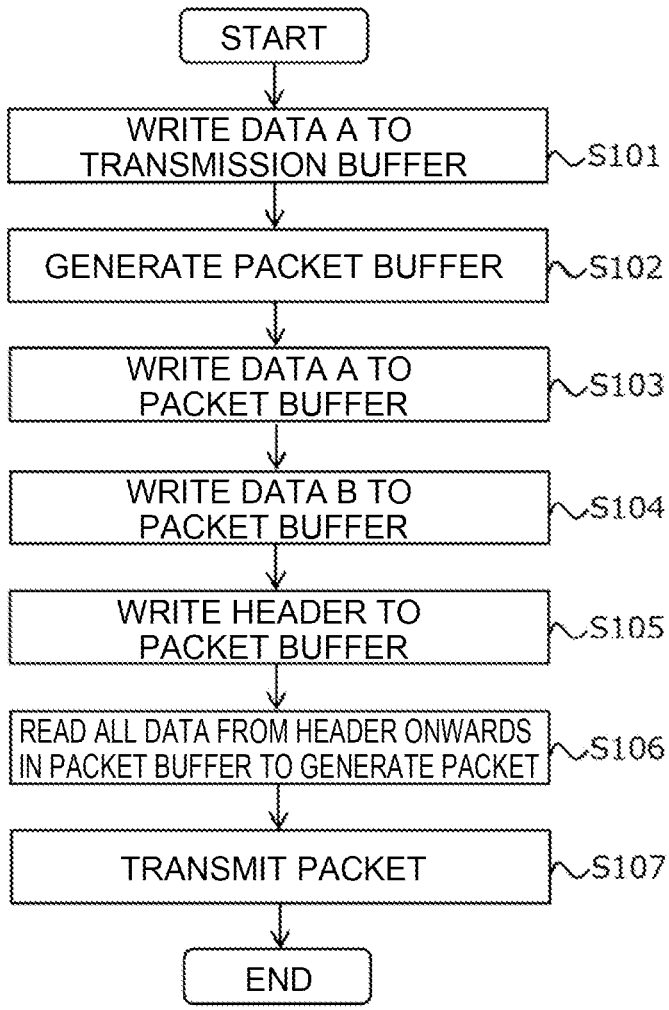
FIG. 7 is a flowchart illustrating an example of an operation in the transmission device according to the first embodiment.

FIG. 7 is a flowchart illustrating an example of the operation in the transmission device 10 according to the first embodiment. Each time the data A is input from the buffer 102A, the writer 120 writes or stores the data A in the transmission buffer 121 in sequence (S101). The data A is to be continuous with the tail address of the lastly stored data A. The buffer manager 123 generates a packet buffer in the storage 126, and generates a descriptor of the packet buffer (S102). The descriptor is stored in a memory region (for example, a ring buffer) for the descriptor of the storage 126. The writer 122A writes the data A from the starting address SA in the packet buffer that is indicated by the descriptor (S103). The packet buffer to which the data A is written is held until a transmission request of the data B is generated. When the data B is received from the buffer 102B, the writer 122B acquires information (descriptor) of a packet buffer to which the data B is written from the writer 122A. The writer 122B accesses the packet buffer to write the data B from the starting address SB in the packet buffer (S104). The packet generator 125 generates a header based on the information of the data A and the data B or the information of the descriptor, and writes the header to the region HR for the header in the packet buffer (S105). The packet generator 125 reads all the data from the header to the tail of the packet buffer, and generates a packet based on all the read data to provide the packet to the transmitter 105 (S106). The transmitter 105 transmits the packet via the antenna 107 (S107).

It is noted that in a case where a packet buffer to which the data A has been written does not exist at a time point at which the transmission request of the data B is generated, the data B may be transmitted by using a packet buffer to which the data A has not been written. In this case, the packet buffer may be prepared in advance, or the buffer manager 123 may be caused to generate the packet buffer in response to a request from the writer 122B or the like. Alternatively, without using the packet buffer, the packet may be generated by directly generating a header from the data B and adding the header to the data B.

As described above, according to the first embodiment, in a case where the data of the plurality of applications is transmitted by the single packet, it is possible to generate the packet with only a small number of times to perform the copying (once in the present example). For example, with regard to the data B with the short time constraint (high priority), once the data B is generated, the data B is promptly transmitted by the single packet together with the data A with the long time constraint (low priority) that has been prepared in advance. Specifically, since the time constraint is long with regard to the data A, the data A is stored in the packet buffer to be prepared for the transmission such that the data A can be transmitted at any time together with the data B. In a case where the transmission request of the data B is generated, by writing the data B to this packet buffer (packet buffer in which the data A has been already stored), the packet containing the data A and the data B can be generated without copying the data B. Thus, it is possible to generate the packet containing the data of the plurality of applications (for example, the data of the plurality of applications with the different time constraints) at a high speed, and the latency of the packet transmission can be avoided.

Second Embodiment

Figure 8:
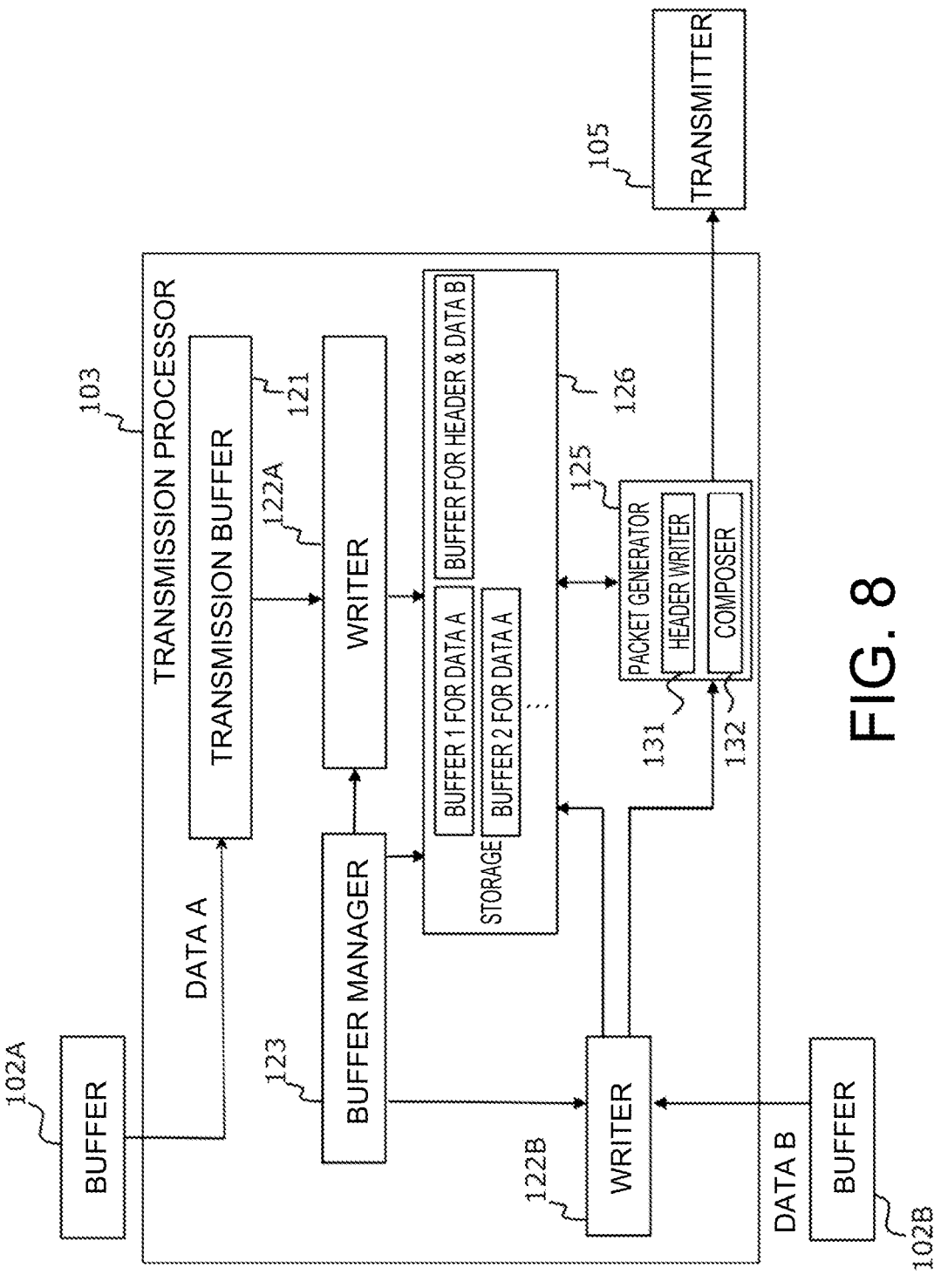
FIG. 8 is a detailed block diagram of the transmission processor in the transmission device according to a second embodiment.

FIG. 8 is a detailed block diagram of the transmission processor 103 of the transmission device 10 according to a second embodiment. A same reference sign is assigned to a part that is the same as or corresponding to that in the block diagram (FIG. 4) of the transmission device 10 according to the first embodiment, and a detailed description thereof will be omitted. Hereinafter, a description will be provided while focusing on a difference from the first embodiment.

The buffer manager 123 generates a buffer for the data A in the storage 126 in response to a request from the writer 122A. The buffer for the data A is a memory region for storing the data A. The buffer manager 123 generates a descriptor of the buffer for the data A, and stores the generated descriptor in a memory region (such as a ring buffer) for the descriptor. As an example, the descriptor has various attributes such as an address of the buffer for the data A and an identifier of the application of the data A. The writer 122A reads, from the head side, the data A that has not yet been read from the transmission buffer 121, and stores the read data A in the buffer for the data A from the head address. A plurality of buffers for the data A may be generated in the storage 126, and the data A read from the transmission buffer 121 may be respectively written thereto. Information for specifying an address range in which the data A is written may be written to the descriptor. For example, a pair of a starting address and an ending address of the data A or a pair of the starting address and a data size of the data A may be written thereto.

In response to a request from the writer 122B, the buffer manager 123 generates a buffer for the header & the data B in the storage 126. The buffer for the header & the data B is a memory region for storing the header and the data B. The buffer for the header & the data B includes a region HR for the header and a region RB for the data B. A head address of the region RB for the data B corresponds to the starting address SB. The buffer manager 123 generates a descriptor of the buffer for the header & the data B, and stores the generated descriptor in a memory region (such as a ring buffer) for the descriptor. As an example, the descriptor has various attributes such as an address of the buffer for the header & the data B, the identifier of the application of the data B, and the starting address SB. In response to a plurality of requests from the writer 122B, the buffer manager 123 may generate a plurality of buffers for the header & the data B in parallel.

A size of the buffer for the data A and a size of the buffer for the header & the data B may be similarly set as in the region RA for the data A, the region HR for the header, and the region RB for the data B in the first embodiment.

The writer 122B acquires, from the buffer manager 123, information (descriptor) of the buffer for the header & the data B to which the data B input from the buffer 102B is to be written. The writer 122B writes the data from the starting address SB in the buffer for the header & the data B. The write by the writer 122B is performed by way of the DMA as an example. Information for specifying an address range in which the data B is written may be written to the descriptor. For example, a pair of a starting address and an ending address of the data B or a pair of the starting address and a data size of the data B may be written thereto.

The packet generator 125 includes the header writer 131 and a composer 132. The packet generator 125 acquires, from the writer 122B, information (descriptor) of the buffer for the header & the data B to which the data B is written. In addition, the packet generator 125 acquires, from the writer 122A, information (descriptor) of the buffer for the data A in which the oldest data A that has not yet been transmitted is stored. The packet generator 125 generates a header based on information of the data B in the buffer for the header & the data B and information of the data A in the buffer for the data A. As an example, the header may be generated based on the descriptor of the buffer for the header & the data B and a file descriptor of the buffer for the data A. The header writer 131 stores the generated header in the region HR for the header in the buffer for the header & the data B.

Figure 9:
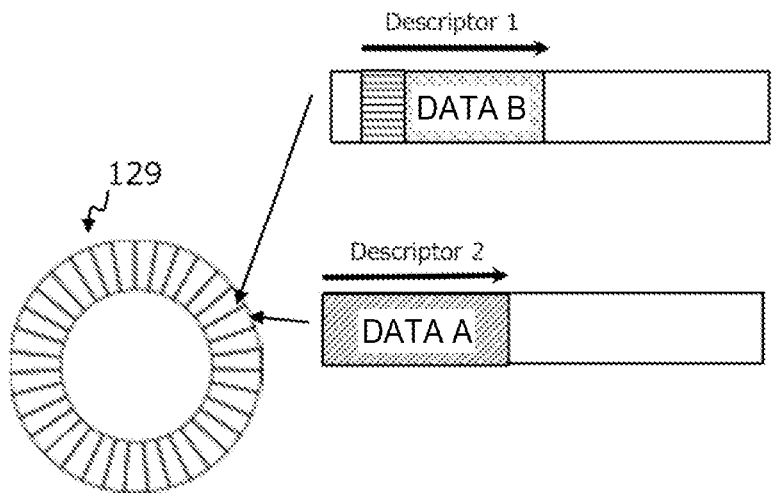
FIG. 9 schematically illustrates a state of a buffer that is indicated by two descriptors.

FIG. 9 schematically illustrates a descriptor (Descriptor 2) of the buffer for the data A, and a descriptor (Descriptor 1) of the buffer for the header & the data B. The Descriptor 2 and the Descriptor 1 are stored in a memory region (ring buffer) for the descriptor 129. Information for specifying an address range in which the data A is stored in the buffer for the data A or the like is stored in the Descriptor 2. Information for specifying an address range in which the header and the data B are stored in the buffer for the header & the data B or the like is stored in the Descriptor 1.

The composer 132 of the packet generator 125 reads the header and the data B that follows the header in the buffer for the header & the data B, and reads the data A in the buffer for the data A to generate a packet based on the header, the data B, and the data A. As an example, the header, the data B, and the data A are combined to generate the packet. The read by the composer 132 is performed by way of the DMA as an example. The composer 132 provides the packet to the transmitter 105.

Figure 10:
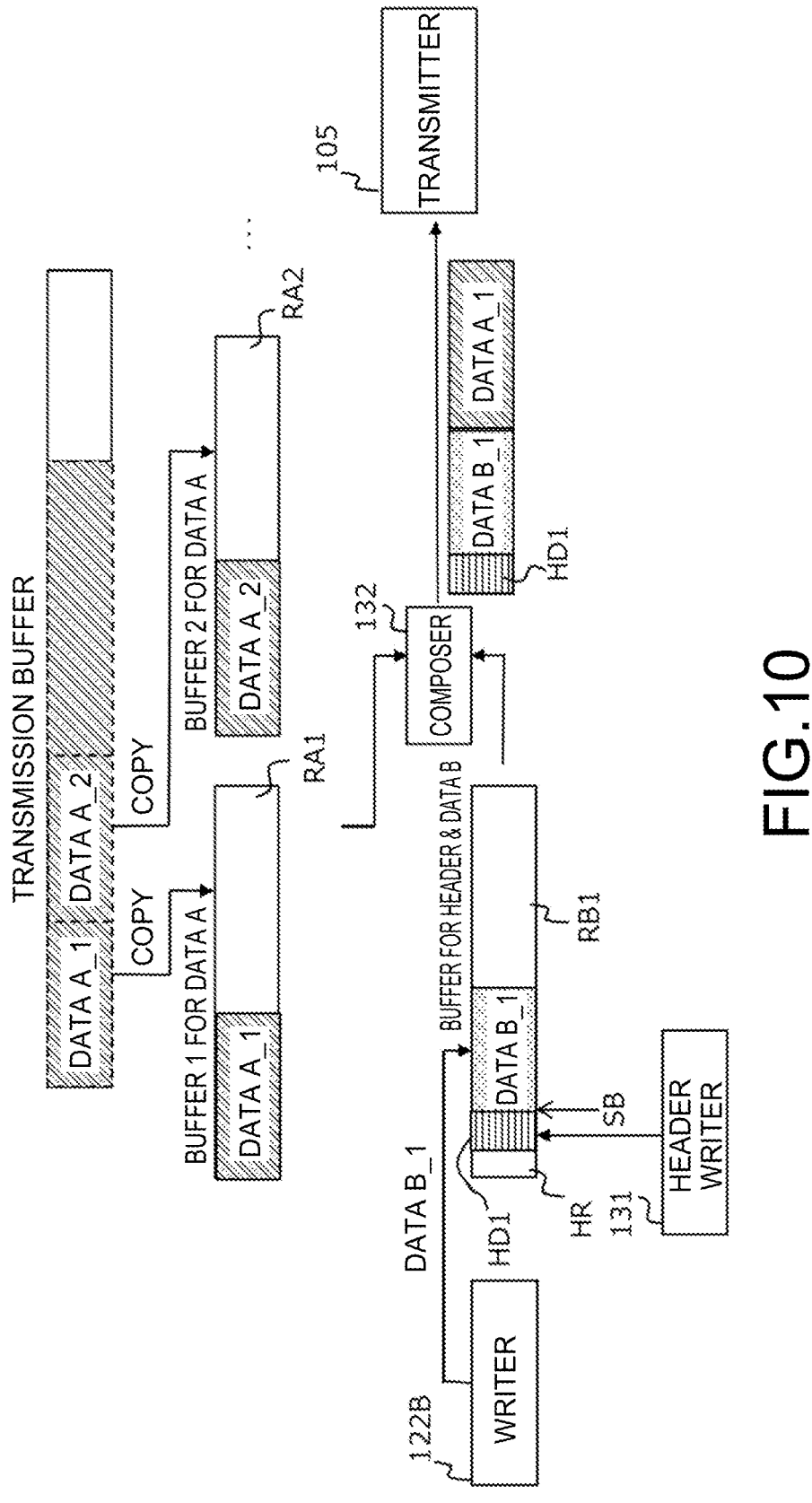
FIG. 10 illustrates an example of the operation of generating the packet according to the first embodiment.

FIG. 10 illustrates an example of the operation of generating the packet. First, data A (denoted as data A_1) is written to the transmission buffer 121, and subsequently, data A (denoted as data A_2) is written for the second write. The data A_1 is read from the transmission buffer 121, and the data A_1 is written from the head address of the buffer 1 for the data A. In other words, the data A_1 is copied from the transmission buffer 121 to the buffer 1 for the data A. Data of the remaining region RA1 in which the data A is not stored out of the buffer 1 for the data A may be optional. Similarly, after the data A_1 is read, the data A_2 is read from the transmission buffer 121, and the data A_2 is written from the head address of the buffer 2 for the data A. In other words, the data A_2 is copied from the transmission buffer 121 to the buffer 2 for the data A. Data of the remaining region RA2 in which the data A_2 is not stored out of the buffer 2 for the data A may be optional. In a case where the data A that has not been read to the transmission buffer 121 exists, and the third and subsequent buffers for the data A can be generated, the data A may be similarly written to the third and subsequent buffers for the data A. The buffers for the data A are used in the order of generation for processing for packet generation.

Next, data B (denoted as data B_1) is input from the buffer 102B to the writer 122B, and the writer 122B receives information (descriptor of the buffer for the header & the data B) for designating the buffer for the header & the data B from the buffer manager 123. The writer 122B writes the data B_1 from the starting address SB of the buffer for the header & the data B. Data of the remaining region RB1 in which the data B_1 is not stored out of the region RB for the data B may be optional.

Next, the packet generator 125 generates a header (denoted as HD1) based on information of the data B_1 in the buffer for the header & the data B and the data A_1 in the buffer 1 for the data A. The packet generator 125 may generate the header HD1 based on information of the descriptor of the buffer for the header & the data B and the descriptor of the buffer 1 for the data A. The header writer 131 writes the header HD1 to the region HR for the header in the buffer for the header & the data B.

The composer 132 reads the header HD1 and the data B_1 from the buffer for the header & the data B, and reads the data A_1 from the buffer for the data A to generate a packet. For example, the header HD1, the data B_1, and the data A_1 are combined to generate the packet. The composer 132 provides the generated packet to the transmitter 105.

Thereafter, in a case where next data B (denoted as data B_2 that is not illustrated in the drawing) is input from the buffer 1028, a packet is generated by using the buffer 2 for the data A in which the data A_2 is stored. Since a detail of the packet generation is similar to that in a case where buffer 1 for the data A is used, a description thereof will be omitted.

Figure 11:
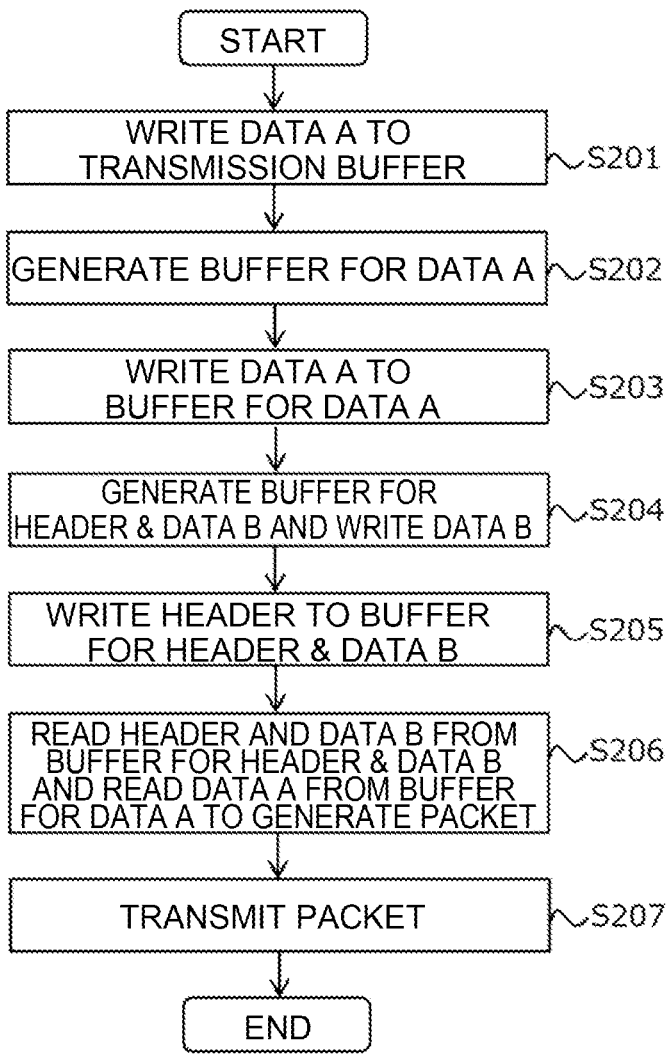
FIG. 11 is a flowchart illustrating an example of the operation in the transmission device according to the second embodiment.

FIG. 11 is a flowchart illustrating an example of the operation in the transmission device 10 according to the second embodiment. Each time the data A is input from the buffer 102A, the writer 120 writes or stores the data A in the transmission buffer 121 in sequence (S201). The data A is to be continuous with the tail address of the lastly stored data A. The buffer manager 123 generates a buffer for the data A in the storage 126 to generate a descriptor of the buffer for the data A (S202). The descriptor is stored in the memory region (for example, a ring buffer) for the descriptor of the storage 126. The writer 122A writes the data A from the head address of the buffer for the data A that is indicated by the descriptor (S203). It is noted however a configuration can also be adopted where the data A is written by setting a halfway address of the buffer for the data A as the starting address. The buffer for the data A to which the data A is written is held until a transmission request of the data B is generated. When the data B is received from the buffer 102B, the writer 1228 requests the buffer manager 123 to generate a buffer for the header & the data B from the writer 122A to acquire information (descriptor) of the buffer for the header & the data B. The writer 122B accesses the buffer for the header & the data B to write the data B from the starting address SB (S204). The packet generator 125 generates a header based on the information of the data A and the data B or the information of the descriptor, and the header writer 131 writes the header to the region HR for the header in the buffer for the header & the data B (S205). The composer 132 reads the header and the data B that follows the header from the buffer for the header & the data B, and reads the data A from the buffer for the data A. The composer 132 generates a packet based on the header, the data B, and the data A that have been read, and provides the generated packet to the transmitter 105 (S206). The transmitter 105 transmits the packet via the antenna 107 (S207).

As described above, according to the second embodiment, in a case where the data of the plurality of applications is transmitted by being contained in the single packet, it is possible to generate the packet with only the small number of times to perform the copying (once in the present example). For example, since the time constraint is long with regard to the data A, the data A is stored in advance in the buffer for the data A such that the data A can be transmitted together with the data B. In a case where a transmission request of the data B with the short time constraint (high priority) is generated, the data B is promptly stored in the buffer for the header & the data B. After a header is generated to be stored in the buffer for the header & the data B, the header, the data B, and the data A are read from these buffers to generate a packet. Accordingly, without copying the data B, the packet containing the data A and the data B can be generated. Thus, it is possible to generate the packet containing the data of the plurality of applications (for example, data of a plurality of applications with different time constraints) at a high speed. In addition, according to the second embodiment, by using separate buffers for the data A and the data B, it is possible to easily generate a packet that does not contain redundant data (data in the regions RA1 and RB1 in the first embodiment).

Third Embodiment

Figure 12:
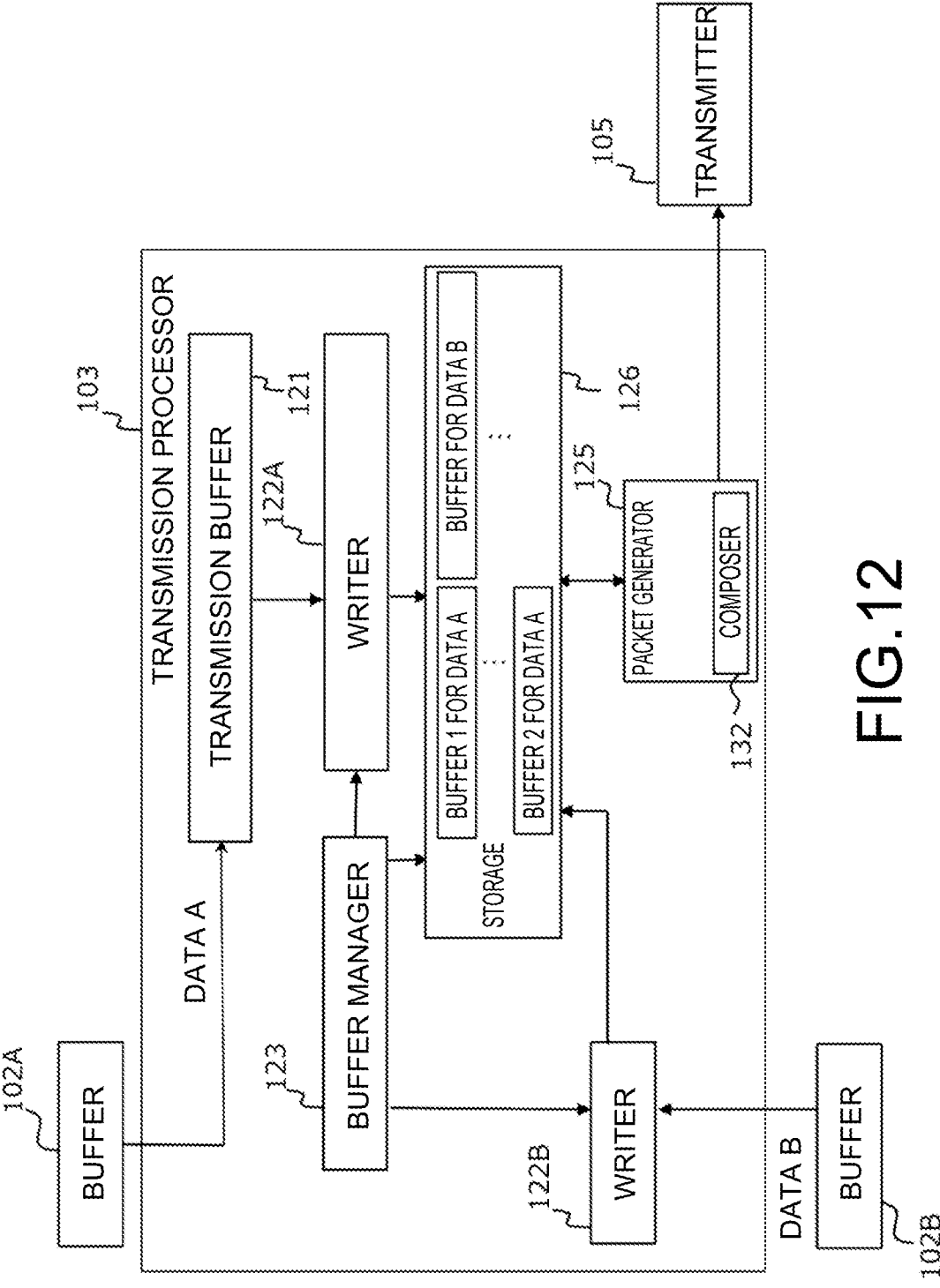
FIG. 12 illustrates another configuration example of the transmission processor in the transmission device according to a third embodiment.

FIG. 12 illustrates another configuration example of the transmission processor 103 of the transmission device 10 according to a third embodiment. A description will be provided while focusing on a difference from the configuration of FIG. 8 of the second embodiment.

The buffer manager 123 generates a buffer for the data B in the storage 126. The buffer manager 123 generates a descriptor of the buffer for the data B, and stores the generated descriptor in a memory region (such as a ring buffer) for the descriptor. When the data B is received from the buffer 102B, the writer 122B acquires information (descriptor) of the buffer for the data B from the buffer manager 123, and writes the data B from a head address of the buffer for the data B. The write of the data B is performed by way of the DMA as an example. The packet generator 125 generates a header based on information of the data B in the buffer for the data B and the data A in the buffer for the data A. As an example, the packet generator 125 generates the header based on information of the descriptor of the buffer for the data B and the descriptor of the buffer for the data A.

Figure 13:
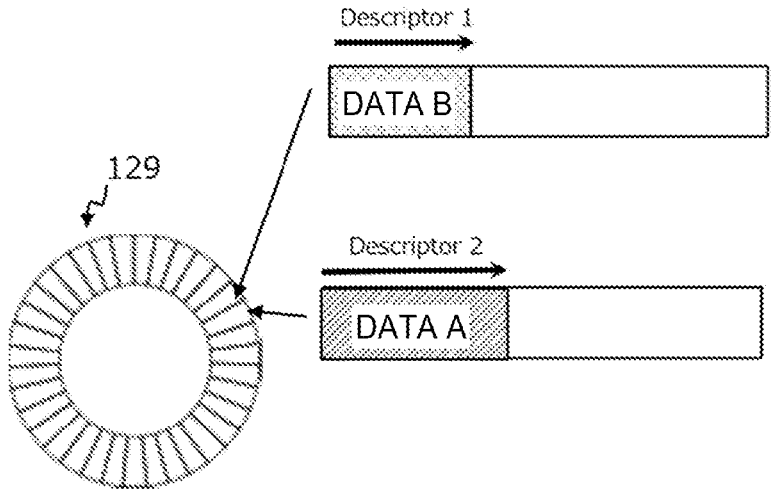
FIG. 13 schematically illustrates a state of the buffer that is indicated by the two descriptors.

FIG. 13 schematically illustrates a descriptor (Descriptor 2) of the buffer for the data A and a descriptor (Descriptor 1) of the buffer for the data B. The Descriptor 2 and the Descriptor 1 are stored in the memory region (ring buffer) for the descriptor 129. Information for specifying an address range in which the data A is stored in the buffer for the data A or the like is stored in the Descriptor 2. Information for specifying an address range in which the header and the data B are stored in the buffer for the data B or the like is stored in the Descriptor 1.

The composer 132 reads the data B from the buffer for the data B and reads the data A from the buffer for the data A, and further uses the header to generate a packet. For example, the header, the data B_1, and the data A_1 are combined to generate the packet. The read by the composer 132 is performed by way of the DMA as an example. The composer 132 provides the generated packet to the transmitter 105. In other words, without writing the header to the buffer for the data B or the like, the header is directly combined with the data B and the data A. The packet generator 125 provides the packet to the transmitter 105.

Figure 14:
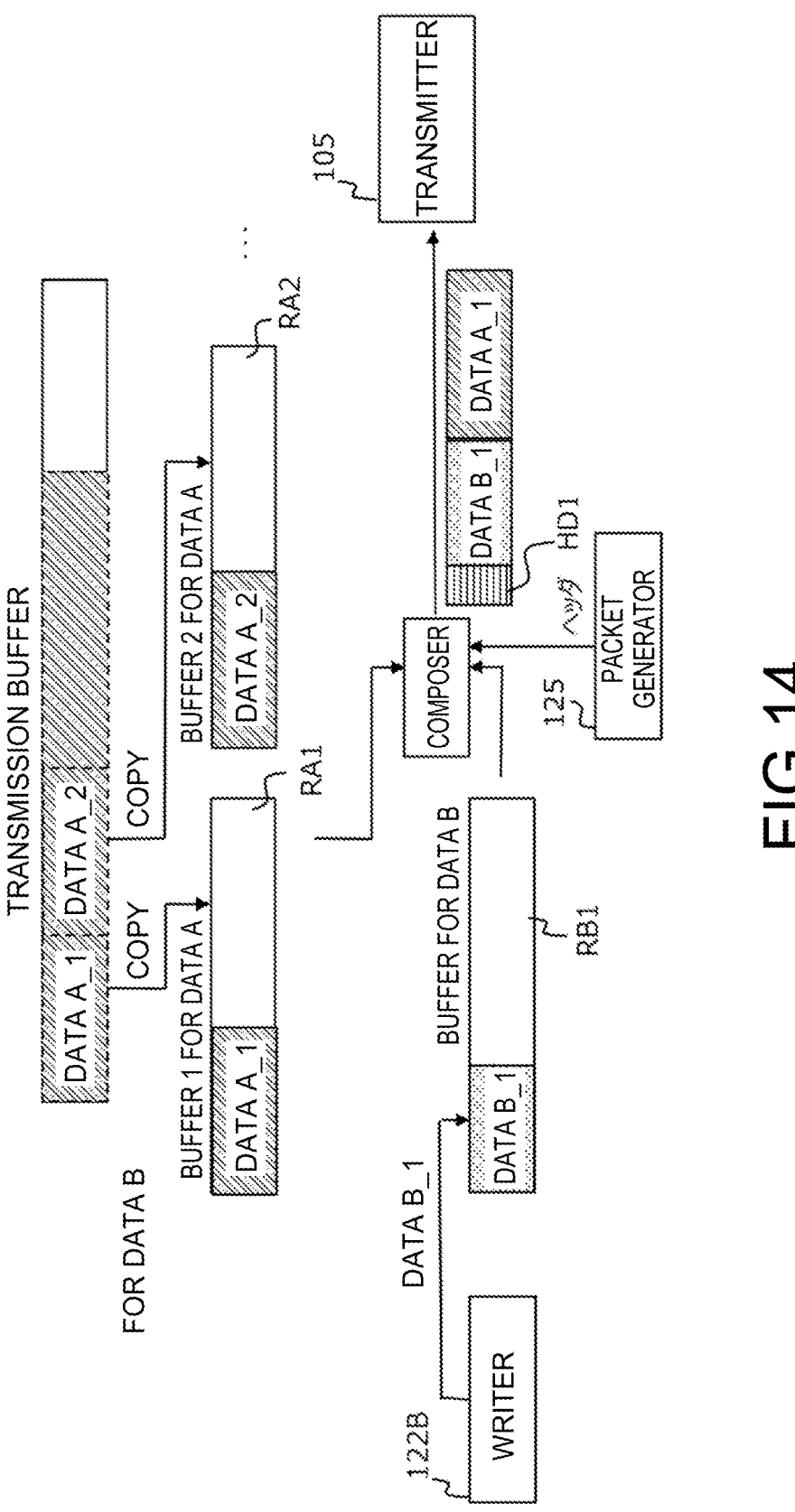
FIG. 14 illustrates an example of an operation of generating a packet according to the third embodiment.

FIG. 14 illustrates an example of the operation of generating the packet. Since processing of writing the data A to the buffer 1 for the data A, the buffer 2 for the data A, or the like is the same as that of the second embodiment, a description thereof will be omitted.

Data B (denoted as data B_1) is input from the buffer 102B to the writer 122B, and the writer 122B receives information (descriptor of the buffer for the data B) for designating the buffer for the data B from the buffer manager 123. The writer 122B writes the data B_1 from the head address of the buffer for the data B. Data of the remaining region RB1 in which the data B_1 is not stored out of the buffer for the data B may be optional.

Next, the packet generator 125 generates a header (denoted as HD1) based on information of the data B_1 in the buffer for the data B and the data A_1 in the buffer 1 for the data A. The packet generator 125 may generate the header HD1 based on information of the descriptor of the buffer for the data B and the descriptor of the buffer 1 for the data A.

The composer 132 reads the data B_1 from the buffer for the data B and reads the data A_1 from the buffer for the data A to generate a packet based on the header HD1, the data B_1, and the data A_1. For example, the header HD1, the data B_1, and the data A_1 are combined to generate the packet. The composer 132 provides the generated packet to the transmitter 105.

Thereafter, in a case where the next data B (denoted as data B_2 that is not illustrated in the drawing) is input from the buffer 102B, a packet is generated by using the buffer 2 for the data A in which the data A_2 is stored. Since a detail of the packet generation is similar to that in a case where the buffer 1 for the data A is used, a description thereof will be omitted.

Figure 15:
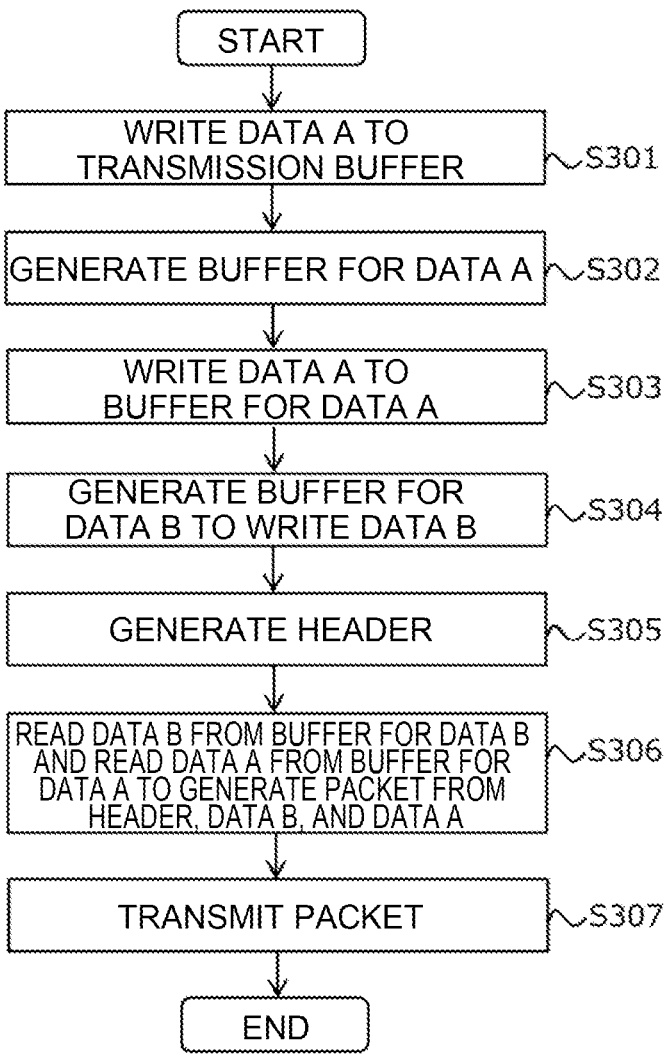
FIG. 15 is a flowchart illustrating an example of the operation in the transmission device according to the third embodiment.

FIG. 15 is a flowchart illustrating an example of the operation in the transmission device 10 according to a third embodiment. Steps S301 to S303 are similar to steps S201 to S203 in FIG. 11 in the second embodiment. When the data B is received from the buffer 102B, the writer 122B requests the buffer manager 123 to generate a buffer for the data B from the writer 122A, and acquires information (descriptor) of the buffer for the data B. The writer 122B accesses the buffer for the data B to write the data B from the starting address SB (S304). The packet generator 125 generates a header based on the information of the data A and the data B or the information of the descriptor (S305). The composer 132 reads the data B from the buffer for the data B, and reads the data A from the buffer for the data A. The composer 132 generates a packet based on the generated header, the data B, and the data A, and provides the generated packet to the transmitter 105 (S306). The transmitter 105 transmits the packet via the antenna 107 (S307).

As described above, according to the third embodiment, since the header is directly combined with the data B and the data A to generates the packet without storing the header in the buffer, a processing load can be lightened. In addition, the packet generation processing cam be simplified.

Fourth Embodiment

Figure 16:
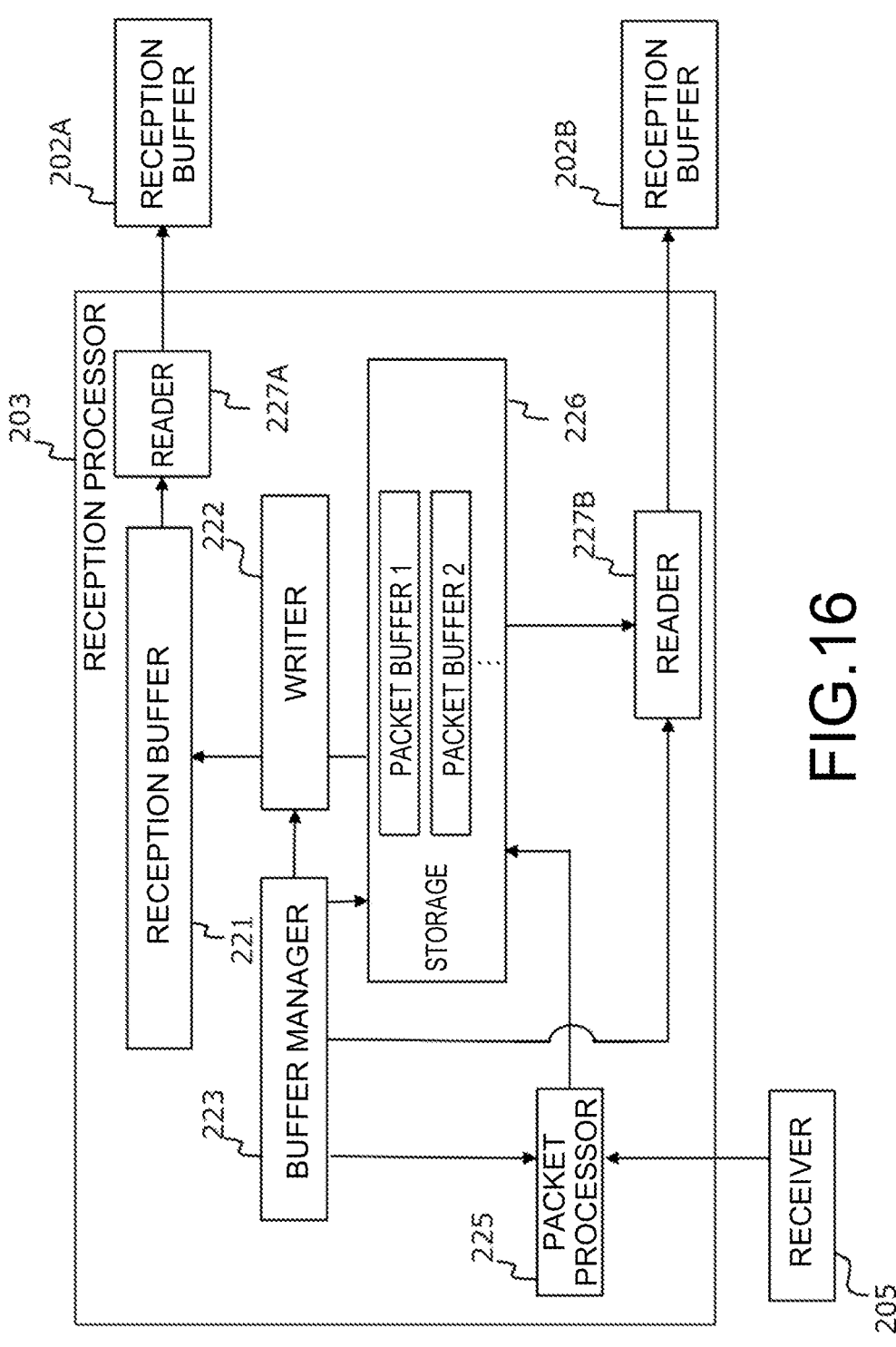
FIG. 16 is a detailed block diagram of a reception processor in a reception device according to a fourth embodiment.

FIG. 16 is a detailed block diagram of the reception processor 203 in the reception device 20 according to a fourth embodiment. The reception processor 203 includes a reception buffer 221, a writer 222, a buffer manager 223, a packet processor 225, a reader 227A (second reader), a reader 227B (first reader), and a storage 126 (memory device). The reception buffer 221 and the storage 226 are configured by a recording medium such as a memory. The memory may be a volatile memory, a non-volatile memory, or both of these. The reception buffer 221 and the storage 226 may be a same recording medium or separate recording media. Processing of the writer 222, the buffer manager 223, the packet processor 225, the reader 227A, and the reader 227B is executed by a processor such as a CPU (Central Processor) as an example.

The reception buffer 221 is a storage region (such as a memory region) having a predetermined size. The reception buffer 221 is configured by a FIFO buffer as an example.

At the time of initialization of the reception processor 203, the buffer manager 223 reserves a memory region for the descriptor in the storage 226. The memory region for the descriptor is configured by a ring buffer as an example.

In addition, in response to a request from the packet processor 225, the buffer manager 223 allocates (generates) a packet buffer (first buffer) serving as a memory region in the storage 226 to a packet to be received. The packet buffer has a memory region with a size equal to or larger than a size of the packet received by the packet processor 225. The packet buffer has a set size as an example. It is noted that the buffer manager 223 may generate a predetermined number (one or more) of packet buffers in the storage 226 in advance.

The buffer manager 223 manages the packet buffer by a buffer identifier and a descriptor corresponding to the buffer identifier. As an example, the descriptor has various attributes such as an address (such as a pointer) of the packet buffer, an identifier of the application, and a size of the stored data. As an example, the descriptor is managed by a ring buffer.

The packet processor 225 receives a reception request of a packet containing data A (second data) and data B (first data) from the receiver 205. The packet processor 225 requests the buffer manager 223 to allocate (generate) a packet buffer, and acquires information (descriptor) of the packet buffer from the buffer manager 223. The packet processor 225 writes the packet in the packet buffer from the head address. The packet processor 225 may provide notification information indicating that the write of the packet has been performed to the writer 222, the buffer manager 223, or the like. Information (such as a packet size) related to the written packet may be written to the descriptor. In addition, the packet processor 225 performs processing on a header of the packet.

Figure 17A:
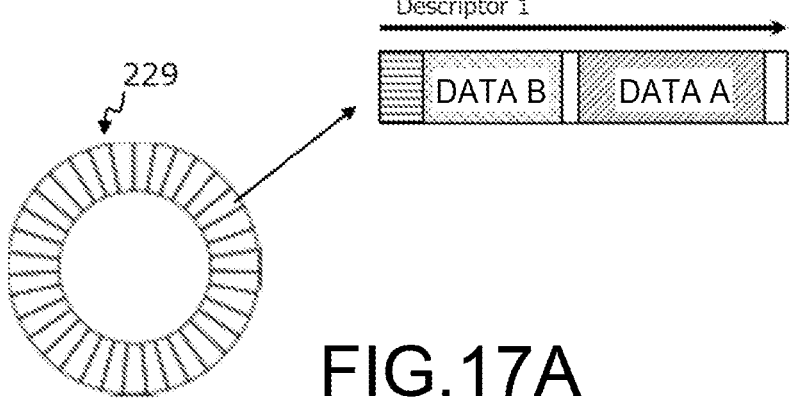
FIG. 17 schematically illustrate a buffer that is indicted by a descriptor.
Figure 17B:
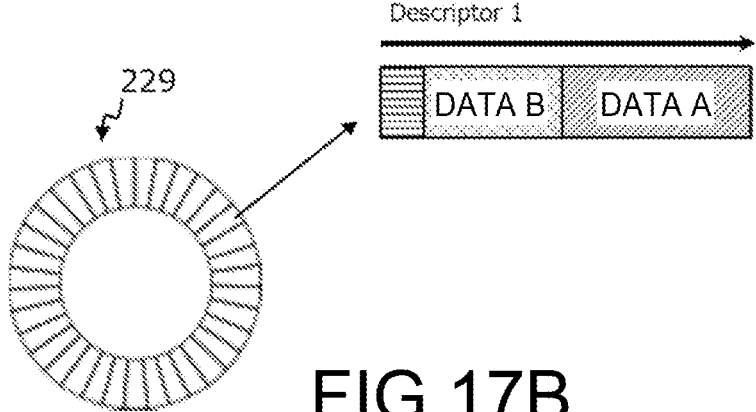

FIG. 17A and FIG. 17B schematically illustrate a descriptor (Descriptor 1) of the packet buffer. In an example of FIG. 17A, an example is illustrated where when the packet of the first embodiment is received, the packet is written to the packet buffer indicated by the Descriptor 1. In an example of FIG. 17B, an example is illustrated where when the packet of the second or third embodiment is received, the packet is written to the packet buffer indicated by the Descriptor 1. The Descriptor 1 is stored in the memory region (ring buffer) for the descriptor 229. Information for specifying an address range in which the packet is stored in the packet buffer or the like may be stored in the Descriptor 1.

The reader 227B acquires information (descriptor) of the packet buffer from the buffer manager 223 or the packet processor 225, and reads the data B from the starting address SB of the packet buffer. As an example, a location of the data B in the packet is specified based on the information of the header, and the starting address SB is calculated from the location of the data B and an address of the packet buffer. The read by the reader 227B is performed by way of the DMA as an example. The reader 227B provides the read data B to the buffer 202B. The reader 227B may provide notification information indicating the completion of the read of the data B to the writer 222, the buffer manager 223, or the like.

The writer 222 acquires information (descriptor) of the packet buffer from the buffer manager 223 or the packet processor 225, and reads the data A from the starting address SA of the packet buffer. As an example, a location of the data A in the packet is specified based on the information of the header, and the starting address SA is calculated from the location of the data A and an address of the packet buffer. The read of the data A is to be performed after the data B is read by the reader 227B. Since the data B is read beforehand, the data B with the short time constraint can be output on a priority basis. The writer 222 writes the read data A to the reception buffer 221. The data A to be written is to be continuous with the tail address of the lastly written data A. The reader 227A reads the data A that has not yet be read from the reception buffer 221, and provides the data A to the buffer 202A. As an example, the read of the data A may be performed at timing according to the time constraint of the application, or may be performed every set time period or each time the data A is stored in the reception buffer 221.

After the data B and the data A are read from the packet buffer, the buffer manager 223 may delete the packet buffer or reuse the packet buffer for the write of another packet.

Figure 18:
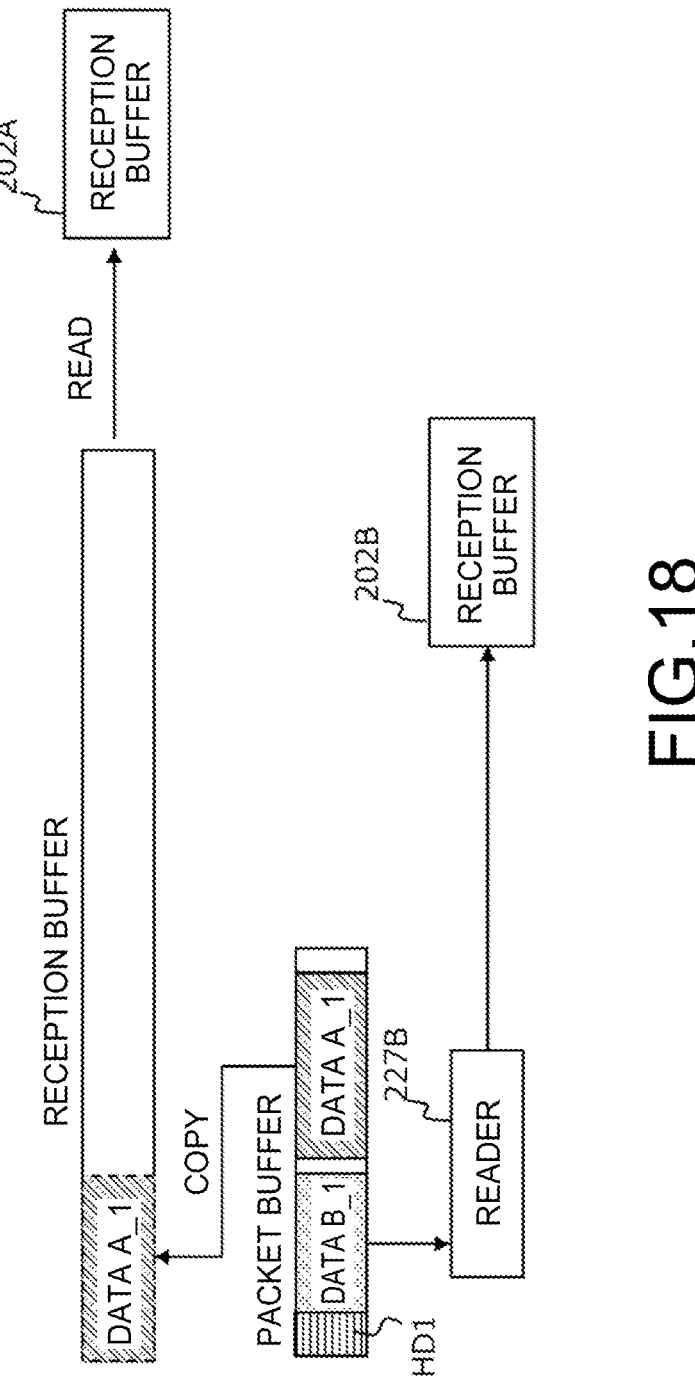
FIG. 18 illustrates an example of an operation of receiving a packet according to the fourth embodiment.

FIG. 18 illustrates an example of an operation of receiving a packet. In response to a reception request of a packet, the packet is written by the packet processor 225 to the packet buffer. First, the reader 227B specifies the starting address SB of the packet buffer based on a header of the packet, and reads data B (denoted as data B_1) from the starting address SB. The reader 227B provides the read data B to the buffer 202B. Next, the writer 222 specifies the starting address SA of the packet buffer based on the header of the packet, and reads data A (denoted as data A_1) from the starting address SA. The writer 222 writes the data A_1 to the reception buffer 221. In other words, the data A_1 is copied from the packet buffer to the reception buffer. The reader 227A reads the data A_1 from the reception buffer 221 to be provided to the buffer 202A. It is noted that in a case where a next packet is received before the read of the data A_1, after data B (denoted as data B_2) contained in the packet is read, data A (denoted as data A_2) contained in the packet is written to be continuous with the tail address of the data A_1. It is noted that a size of the data A to be read from the reception buffer 221 and a size of the data A to be written to the reception buffer 221 do not necessarily need to be the same. For example, a part and a remaining part of the data A_1 may be read at separate timing.

Figure 19:
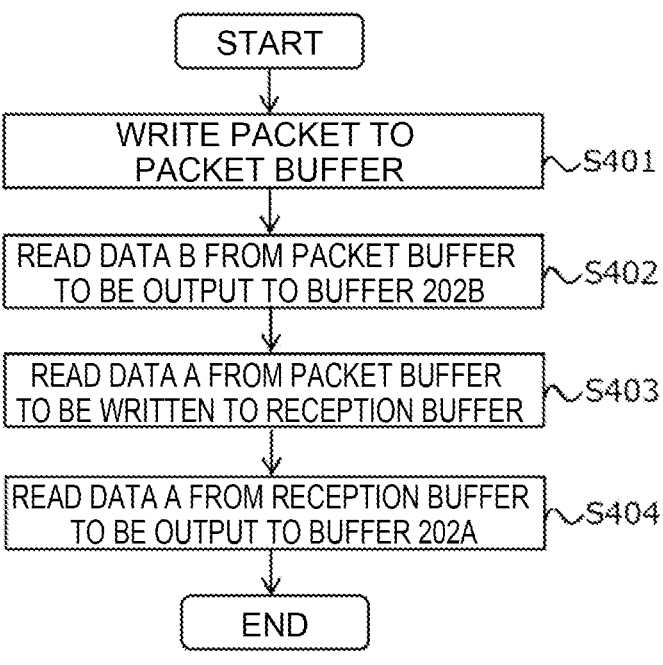
FIG. 19 is a flowchart illustrating an example of the operation in the reception device according to the fourth embodiment.

FIG. 19 is a flowchart illustrating an example of the operation in the reception device 20 according to the fourth embodiment. A reception request of a packet is input from the receiver 205. The buffer manager 223 generates a packet buffer, and generates a descriptor of the packet buffer. It is noted that the packet buffer and the descriptor may be generated before the packet is input. The packet processor 225 writes the packet to the packet buffer (S401). The reader 227B accesses the packet buffer based on the descriptor, and specifies a location of the data B based on a header (S402). The reader 227B reads the data B from the packet buffer, and provides the data B to the buffer 202B (the same S402). After the data B is read from the reader 227B, the writer 222 accesses the packet buffer based on the descriptor, and specifies a location of the data A based on a header (S403). The writer 222 reads the data A from the packet buffer, and writes the data A to the reception buffer 221 (the same S403). The data A is to be continuous with the tail address of the lastly stored data A. The reader 227A reads the data A from the reception buffer 221, and provides the data A to the buffer 202A (S404).

As described above, according to the fourth embodiment, in a case where a packet containing data of a plurality of applications is received, each data contained in the packet can be read with only the small number of times to perform the copying (once in the present example). For example, since the time constraint is short with regard to the data B, the data B is immediately read and output from the packet buffer in which the packet is stored. With regard to the data A with the long time constraint, after the data B is read, the data A is read from the packet buffer to be stored in the reception buffer. Accordingly, without copying the data B, the data A and the data B can be read while the respective time constraints are satisfied. Thus, it is possible to perform reception processing at a high speed on the packet containing the data of the plurality of applications (for example, data of a plurality of applications with different time constraints). In addition, according to the fourth embodiment, it is possible to perform the reception processing at a high speed on any of the packet generated in the first embodiment and the packet generated in the second or third embodiment.

Fifth Embodiment

Figure 20:
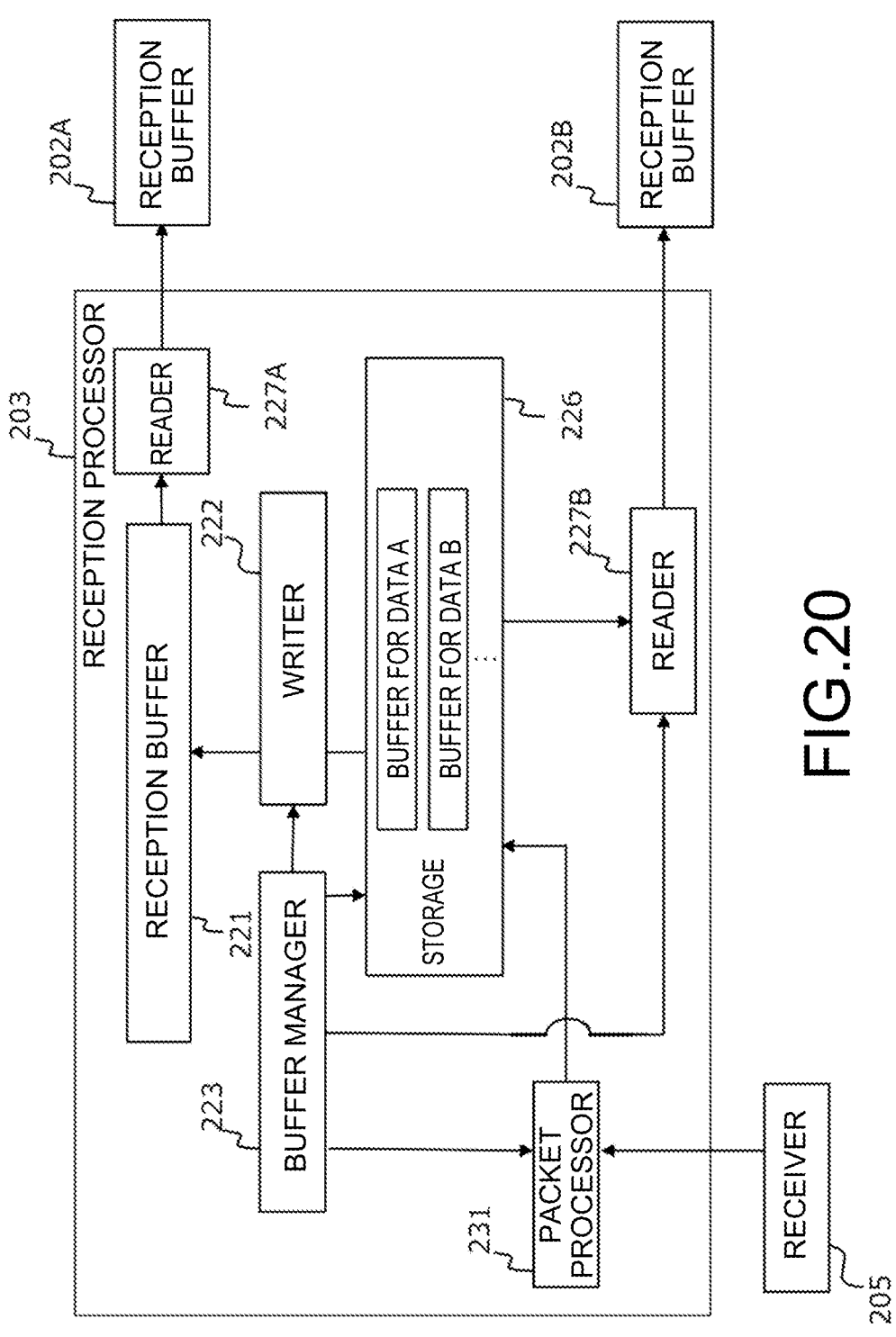
FIG. 20 is a detailed block diagram of the reception processor in the reception device according to a fifth embodiment.

FIG. 20 is a detailed block diagram of the reception processor 203 in the reception device 20 according to a fifth embodiment. A reference sign referring to the packet processor is replaced with a reference sign 231. A description will be provided while focusing on a difference from the configuration of FIG. 8 of the fourth embodiment.

In response to a request from the packet processor 225 that has received a reception request of a packet, the buffer manager 223 allocates a buffer (first buffer) for data B to data B (first data) and allocates a buffer (second buffer) for data A to data A (second data) in the storage 226. The buffer manager 223 generates a descriptor of the buffer for the data B, and stores the generated descriptor in a memory region (such as a ring buffer) for the descriptor. The buffer manager 223 generates a descriptor of the buffer for the data A, and stores the generated descriptor in the memory region for the descriptor. When the packet is received from the receiver 205, after a header of the packet is processed, the packet processor 231 acquires information (descriptor) of the buffer for the data B from the buffer manager 223, and writes the data B from the head address of the buffer for the data B. The packet processor 231 acquires information (descriptor) of the buffer for the data A from the buffer manager 223, and writes the data A from the head address of the buffer for the data A.

Figure 21:
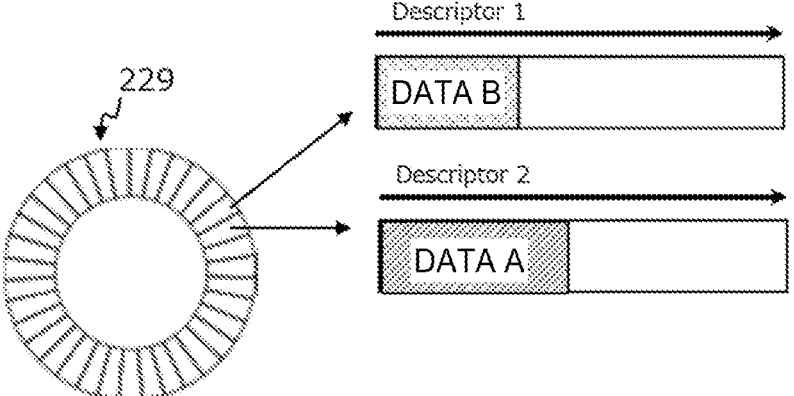
FIG. 21 schematically illustrates a state of the buffer that is indicated by the two descriptors.

FIG. 21 schematically illustrates a descriptor (Descriptor 2) of the buffer for the data A and a descriptor (Descriptor 1) of the buffer for the data B. The Descriptor 2 and the Descriptor 1 are stored in the memory region (ring buffer) for the descriptor 229. Information for specifying an address range in which the data A is stored in the buffer for the data A or the like is stored in the Descriptor 2. Information for specifying an address range in which the header and the data B are stored in the buffer for the data B or the like is stored in the Descriptor 1.

The reader 227B acquires information (descriptor) of the buffer for the data B from the buffer manager 223 or the packet processor 225, and reads the data B from the head address of the buffer for the data B. The read by the reader 227B is performed by way of the DMA as an example. The reader 227B provides the read data B to the buffer 202B. The reader 227B may provide notification information indicating the completion of the read of the data B to the writer 222, the buffer manager 223, or the like.

The writer 222 acquires information (descriptor) of the buffer for the data A from the buffer manager 223 or the packet processor 225, and reads the data A from the head address of the buffer for the data A. The read of the data A may be performed in parallel with the read of the data B, or may be performed after the read of the data B. Since the data A and the data B are stored in separate buffers, the data A can be independently set from the timing of read of the data B. The writer 222 writes the read data A to the reception buffer 221. The data A to be written is to be continuous with the tail address of the lastly written data A. The reader 227A reads the data A that has not yet been read from the reception buffer 221, and provides the data A to the buffer 202A.

Figure 22:
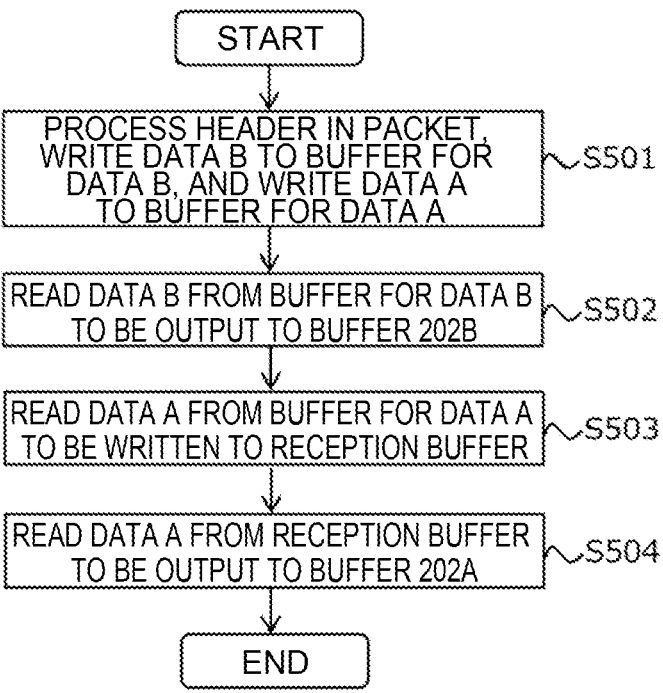
FIG. 22 is a flowchart illustrating an example of the operation in the reception device according to the fifth embodiment.

FIG. 22 is a flowchart illustrating an example of the operation in the reception device 20 according to the fifth embodiment. A packet is input from the receiver 205. The buffer manager 223 generates a buffer for the data B and a buffer for the data A, and generates a descriptor of each buffer. It is noted that before the packet is input, the buffer for the data B, the buffer for the data A, and the descriptors of the respective buffers may be generated. After the packet processor 225 processes a header, the data B is written to the buffer for the data B, and the data A is written to the buffer for the data A (S501). The reader 227B accesses the buffer for the data B based on the descriptor to read the data B from the buffer for the data B (S502). The reader 227B provides the data B to the buffer 202B (the same S502). The writer 222 accesses the buffer for the data A based on the descriptor to read the data A from the buffer for the data A (S503). The writer 222 writes the data A to the reception buffer 221 (the same S503). The data A is to be continuous with the tail address of the lastly stored data A. The reader 227A reads the data A from the reception buffer 221, and provides the data A to the buffer 202A (S504).

As described above, according to the fifth embodiment, in a case where the packet containing the data of the plurality of applications is received, each data contained in the packet can be read with only the small number of times to perform the copying (once in the present example). For example, the data B and the data A contained in the packet are respectively written to the buffer for the data B and the buffer for the data A. In other words, the data B and the data A are divided into a plurality of descriptors to be transferred to memories (buffers). The data B is immediately read and output from the buffer for the data B. The data A is written (copied) from the buffer for the data A to the reception buffer, and is read from the reception buffer at timing according to the time constraint of the application A or the like. Accordingly, without copying the data B, the data A and the data B can be read while the respective time constraints are satisfied. Thus, it is possible to perform the reception processing at a high speed on the packet containing the data of the plurality of applications (for example, data of a plurality of applications with different time constraints). In addition, according to the fourth embodiment, it is possible to perform the reception processing at a high speed on any of the packet generated in the first embodiment and the packet generated in the second or third embodiment.

Modified Example

According to the fifth embodiment, instead of the buffer for the data B, a buffer for the header & the data B may be generated, and the header and the data B may be written to the buffer for the header & the data B. The reader 227B reads the data B from the buffer for the header & the data B. A location of the data B in the buffer for the header & the data B can be specified based on the header.

Sixth Embodiment

Some or all of each device (the transmission device 20 or the reception device 10) in the above embodiment may be configured in hardware, or information processing of software (program) executed by, for example, a CPU (Central Processing Unit), GPU (Graphics Processing Unit). In the case of the information processing of software, software that enables at least some of the functions of each device in the above embodiments may be stored in a non-volatile storage medium (non-volatile computer readable medium) such as CD-ROM (Compact Disc Read Only Memory) or USB (Universal Serial Bus) memory, and the information processing of software may be executed by loading the software into a computer. In addition, the software may also be downloaded through a communication network. Further, entire or a part of the software may be implemented in a circuit such as an ASIC (Application Specific Integrated Circuit) or FPGA (Field Programmable Gate Array), wherein the information processing of the software may be executed by hardware.

A storage medium to store the software may be a removable storage media such as an optical disk, or a fixed type storage medium such as a hard disk, or a memory. The storage medium may be provided inside the computer (a main storage device or an auxiliary storage device) or outside the computer.

Figure 23:
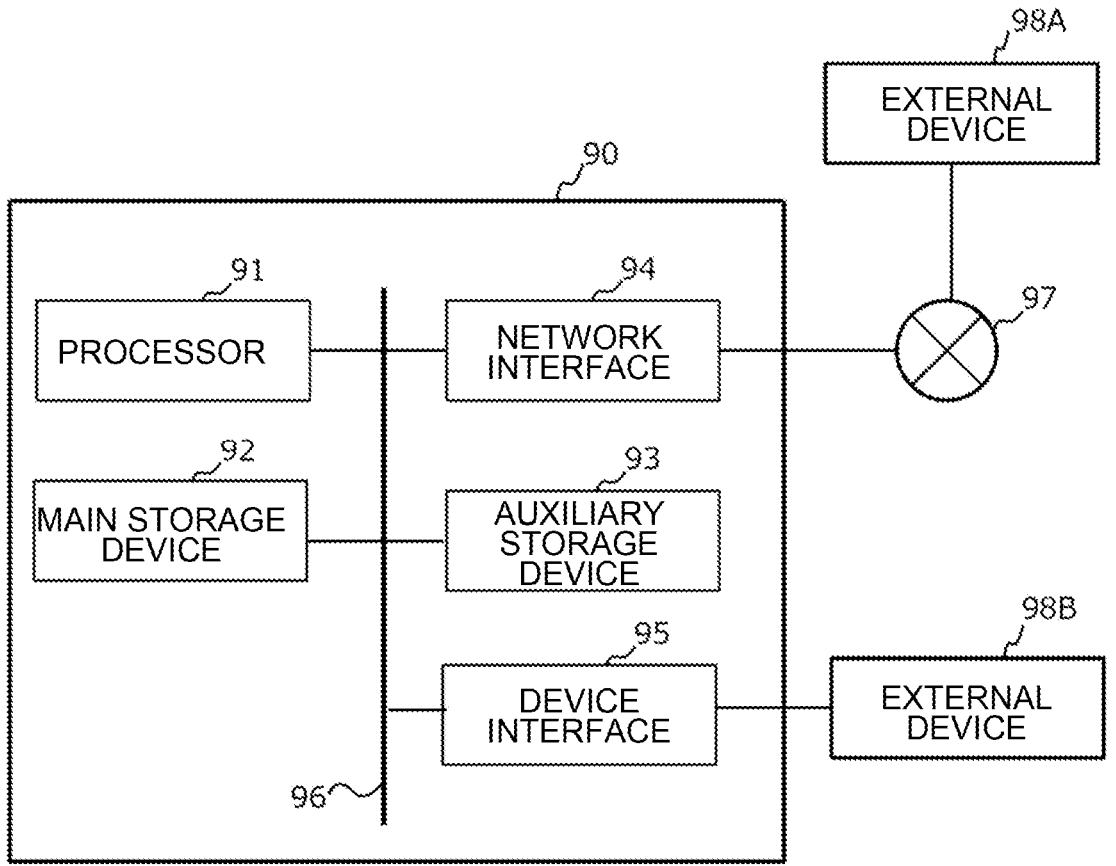
FIG. 23 is a block diagram of a hardware configuration example of each device in the embodiments described above.

FIG. 23 is a block diagram illustrating an example of a hardware configuration of each device (the transmission device 20 or the reception device 10) in the above embodiments. As an example, each device may be implemented as a computer 90 provided with a processor 91, a main storage device 92, an auxiliary storage device 93, a network interface 94, and a device interface 95, which are connected via a bus 96.

The computer 90 of FIG. 23 is provided with each component one by one but may be provided with a plurality of the same components. Although one computer 90 is illustrated in FIG. 23, the software may be installed on a plurality of computers, and each of the plurality of computer may execute the same or a different part of the software processing. In this case, it may be in a form of distributed computing where each of the computers communicates with each of the computers through, for example, the network interface 94 to execute the processing. That is, each device (the transmission device 20 or the reception device 10) in the above embodiments may be configured as a system where one or more computers execute the instructions stored in one or more storages to enable functions. Each device may be configured such that the information transmitted from a terminal is processed by one or more computers provided on a cloud and results of the processing are transmitted to the terminal.

Various arithmetic operations of each device (the transmission device 20 or the reception device 10) in the above embodiments may be executed in parallel processing using one or more processors or using a plurality of computers over a network. The various arithmetic operations may be allocated to a plurality of arithmetic cores in the processor and executed in parallel processing. Some or all the processes, means, or the like of the present disclosure may be implemented by at least one of the processors or the storage devices provided on a cloud that can communicate with the computer 90 via a network. Thus, each device in the above embodiments may be in a form of parallel computing by one or more computers.

The processor 91 may be an electronic circuit (such as, for example, a processor, processing circuitry, processing circuitry, CPU, GPU, FPGA, or ASIC) that executes at least controlling the computer or arithmetic calculations. The processor 91 may also be, for example, a general-purpose processing circuit, a dedicated processing circuit designed to perform specific operations, or a semiconductor device which includes both the general-purpose processing circuit and the dedicated processing circuit. Further, the processor 91 may also include, for example, an optical circuit or an arithmetic function based on quantum computing.

The processor 91 may execute an arithmetic processing based on data and/or a software input from, for example, each device of the internal configuration of the computer 90, and may output an arithmetic result and a control signal, for example, to each device. The processor 91 may control each component of the computer 90 by executing, for example, an OS (Operating System), or an application of the computer 90.

Each device (the transmission device 20 or the reception device 10) in the above embodiments may be enabled by one or more processors 91. The processor 91 may refer to one or more electronic circuits located on one chip, or one or more electronic circuitries arranged on two or more chips or devices. In the case of a plurality of electronic circuitries are used, each electronic circuit may communicate by wired or wireless.

The main storage device 92 may store, for example, instructions to be executed by the processor 91 or various data, and the information stored in the main storage device 92 may be read out by the processor 91. The auxiliary storage device 93 is a storage device other than the main storage device 92. These storage devices shall mean any electronic component capable of storing electronic information and may be a semiconductor memory. The semiconductor memory may be either a volatile or non-volatile memory. The storage device for storing various data or the like in each device (the transmission device 20 or the reception device 10) in the above embodiments may be enabled by the main storage device 92 or the auxiliary storage device 93 or may be implemented by a built-in memory built into the processor 91. For example, the storages 102, 202 in the above embodiments may be implemented in the main storage device 92 or the auxiliary storage device 93.

In the case of each device (the transmission device 20 or the reception device 10) in the above embodiments is configured by at least one storage device (memory) and at least one of a plurality of processors connected/coupled to/with this at least one storage device, at least one of the plurality of processors may be connected to a single storage device. Or at least one of the plurality of storages may be connected to a single processor. Or each device may include a configuration where at least one of the plurality of processors is connected to at least one of the plurality of storage devices. Further, this configuration may be implemented by a storage device and a processor included in a plurality of computers. Moreover, each device may include a configuration where a storage device is integrated with a processor (for example, a cache memory including an L1 cache or an L2 cache).

The network interface 94 is an interface for connecting to a communication network 97 by wireless or wired. The network interface 94 may be an appropriate interface such as an interface compatible with existing communication standards. With the network interface 94, information may be exchanged with an external device 98A connected via the communication network 97. Note that the communication network 97 may be, for example, configured as WAN (Wide Area Network), LAN (Local Area Network), or PAN (Personal Area Network), or a combination of thereof, and may be such that information can be exchanged between the computer 90 and the external device 98A. The internet is an example of WAN, IEEE802.11 or Ethernet (registered trademark) is an example of LAN, and Bluetooth (registered trademark) or NFC (Near Field Communication) is an example of PAN.

The device interface 95 is an interface such as, for example, a USB that directly connects to the external device 98B.

The external device 98A is a device connected to the computer 90 via a network. The external device 98B is a device directly connected to the computer 90.

The external device 98A or the external device 98B may be, as an example, an input device. The input device is, for example, a device such as a camera, a microphone, a motion capture, at least one of various sensors, a keyboard, a mouse, or a touch panel, and gives the acquired information to the computer 90. Further, it may be a device including an input unit such as a personal computer, a tablet terminal, or a smartphone, which may have an input unit, a memory, and a processor.

The external device 98A or the external device 98B may be, as an example, an output device. The output device may be, for example, a display device such as, for example, an LCD (Liquid Crystal Display), or an organic EL (Electro Luminescence) panel, or a speaker which outputs audio. Moreover, it may be a device including an output unit such as, for example, a personal computer, a tablet terminal, or a smartphone, which may have an output unit, a memory, and a processor.

Further, the external device 98A or the external device 98B may be a storage device (memory). The external device 98A may be, for example, a network storage device, and the external device 98B may be, for example, an HDD storage.

Furthermore, the external device 98A or the external device 98B may be a device that has at least one function of the configuration element of each device (the transmission device 20 or the reception device 10) in the above embodiments. That is, the computer 90 may transmit a part of or all of processing results to the external device 98A or the external device 98B, or receive a part of or all of processing results from the external device 98A or the external device 98B.

In the present specification (including the claims), the representation (including similar expressions) of "at least one of a, b, and c" or "at least one of a, b, or c" includes any combinations of a, b, c, a-b, a-c, b-c, and a-b-c. It also covers combinations with multiple instances of any element such as, for example, a-a, a-b-b, or a-a-b-b-c-c. It further covers, for example, adding another element d beyond a, b, and/or c, such that a-b-c-d.

In the present specification (including the claims), the expressions such as, for example, "data as input," "using data," "based on data," "according to data," or "in accordance with data" (including similar expressions) are used, unless otherwise specified, this includes cases where data itself is used, or the cases where data is processed in some ways (for example, noise added data, normalized data, feature quantities extracted from the data, or intermediate representation of the data) are used. When it is stated that some results can be obtained "by inputting data," "by using data," "based on data," "according to data," "in accordance with data" (including similar expressions), unless otherwise specified, this may include cases where the result is obtained based only on the data, and may also include cases where the result is obtained by being affected factors, conditions, and/or states, or the like by other data than the data. When it is stated that "output/outputting data" (including similar expressions), unless otherwise specified, this also includes cases where the data itself is used as output, or the cases where the data is processed in some ways (for example, the data added noise, the data normalized, feature quantity extracted from the data, or intermediate representation of the data) is used as the output.

In the present specification (including the claims), when the terms such as "connected (connection)" and "coupled (coupling)" are used, they are intended as non-limiting terms that include any of "direct connection/coupling," "indirect connection/coupling," "electrically connection/coupling," "communicatively connection/coupling," "operatively connection/coupling," "physically connection/coupling," or the like. The terms should be interpreted accordingly, depending on the context in which they are used, but any forms of connection/coupling that are not intentionally or naturally excluded should be construed as included in the terms and interpreted in a non-exclusive manner.

In the present specification (including the claims), when the expression such as "A configured to B," this may include that a physically structure of A has a configuration that can execute operation B, as well as a permanent or a temporary setting/configuration of element A is configured/set to actually execute operation B. For example, when the element A is a general-purpose processor, the processor may have a hardware configuration capable of executing the operation B and may be configured to actually execute the operation B by setting the permanent or the temporary program (instructions). Moreover, when the element A is a dedicated processor, a dedicated arithmetic circuit, or the like, a circuit structure of the processor or the like may be implemented to actually execute the operation B, irrespective of whether or not control instructions and data are actually attached thereto.

In the present specification (including the claims), when a term referring to inclusion or possession (for example, "comprising/including," "having," or the like) is used, it is intended as an open-ended term, including the case of inclusion or possession an object other than the object indicated by the object of the term. If the object of these terms implying inclusion or possession is an expression that does not specify a quantity or suggests a singular number (an expression with a or an article), the expression should be construed as not being limited to a specific number.

In the present specification (including the claims), although when the expression such as "one or more," "at least one," or the like is used in some places, and the expression that does not specify a quantity or suggests a singular number (the expression with a or an article) is used elsewhere, it is not intended that this expression means "one." In general, the expression that does not specify a quantity or suggests a singular number (the expression with a or an as article) should be interpreted as not necessarily limited to a specific number.

In the present specification, when it is stated that a particular configuration of an example results in a particular effect (advantage/result), unless there are some other reasons, it should be understood that the effect is also obtained for one or more other embodiments having the configuration. However, it should be understood that the presence or absence of such an effect generally depends on various factors, conditions, and/or states, etc., and that such an effect is not always achieved by the configuration. The effect is merely achieved by the configuration in the embodiments when various factors, conditions, and/or states, etc., are met, but the effect is not always obtained in the claimed invention that defines the configuration or a similar configuration.

In the present specification (including the claims), when the term such as "maximize/maximization" is used, this includes finding a global maximum value, finding an approximate value of the global maximum value, finding a local maximum value, and finding an approximate value of the local maximum value, should be interpreted as appropriate accordingly depending on the context in which the term is used. It also includes finding on the approximated value of these maximum values probabilistically or heuristically. Similarly, when the term such as "minimize" is used, this includes finding a global minimum value, finding an approximated value of the global minimum value, finding a local minimum value, and finding an approximated value of the local minimum value, and should be interpreted as appropriate accordingly depending on the context in which the term is used. It also includes finding the approximated value of these minimum values probabilistically or heuristically. Similarly, when the term such as "optimize" is used, this includes finding a global optimum value, finding an approximated value of the global optimum value, finding a local optimum value, and finding an approximated value of the local optimum value, and should be interpreted as appropriate accordingly depending on the context in which the term is used. It also includes finding the approximated value of these optimal values probabilistically or heuristically.

In the present specification (including claims), when a plurality of hardware performs a predetermined process, the respective hardware may cooperate to perform the predetermined process, or some hardware may perform all the predetermined process. Further, a part of the hardware may perform a part of the predetermined process, and the other hardware may perform the rest of the predetermined process. In the present specification (including claims), when an expression (including similar expressions) such as "one or more hardware perform a first process and the one or more hardware perform a second process," or the like, is used, the hardware that perform the first process and the hardware that perform the second process may be the same hardware, or may be the different hardware. That is: the hardware that perform the first process and the hardware that perform the second process may be included in the one or more hardware. Note that, the hardware may include an electronic circuit, a device including the electronic circuit, or the like.

In the present specification (including the claims), when a plurality of storage devices (memories) store data, an individual storage device among the plurality of storage devices may store only a part of the data or may store the entire data. Further, some storage devices among the plurality of storage devices may include a configuration for storing data.

While certain embodiments of the present disclosure have been described in detail above, the present disclosure is not limited to the individual embodiments described above. Various additions, changes, substitutions, partial deletions, etc. are possible to the extent that they do not deviate from the conceptual idea and purpose of the present disclosure derived from the contents specified in the claims and their equivalents. For example, when numerical values or mathematical formulas are used in the description in the above-described embodiments, they are shown for illustrative purposes only and do not limit the scope of the present disclosure. Further, the order of each operation shown in the embodiments is also an example, and does not limit the scope of the present disclosure.

REFERENCE SIGNS LIST 1A sensor
1B sensor
10 transmission device
20 reception device
30 communication network
90 computer
91 processor
92 main storage device
93 auxiliary storage device
94 network interface
95 device interface
96 bus
97 communication network
98A external device
98B external device
101A, 101B data acquirer
102A buffer
102B buffer
103 transmission processor
104 controller
105 transmitter
107 antenna
120 writer
121 transmission buffer
122A writer
122B writer
123 buffer manager
125 packet generator
126 storage
129 ring buffer
132 composer
140 temporary storage
201A, 201B data processor
202A, 202B buffer
203 reception processor
205 receiver
207 antenna
221 reception buffer
222 writer
223 buffer manager
225 packet processor 226 storage
227A, 227B reader
229 ring buffer
231 packet processor

The invention claimed is:

1. A transmission device comprising:
a first writer configured to read, from a transmission buffer configured to store first data related to a first application, the first data, and to write the first data that is read to a first memory region and to hold the written first data in the first memory region until a transmission request of second data is generated; and
a packet generator configured to read, in a case where the transmission request of the second data related to a second application different from the first application is generated after the first data is written to the first memory region, the first data in the first memory region, and to generate a packet containing both the first data and the second data.

2. The transmission device according to claim 1, comprising:
a second writer configured to write the second data to a second memory region, wherein
the packet generator reads the second data in the second memory region, and generates the packet.

3. The transmission device according to claim 2, comprising:
a buffer manager configured to allocate a first buffer including the first memory region and the second memory region to the packet, wherein
the second writer specifies the first buffer in which the first data is written to the first memory region, and writes the second data to the second memory region of the specified first buffer,
the packet generator reads all data in the first memory region and all data in the second memory region from the first buffer, and
the packet contains all the data in the first memory region and all the data in the second memory region.

4. The transmission device according to claim 3, wherein
the packet generator generates first location information for specifying a location where the first data is contained in the packet based on a range in which the first data is stored out of the first memory region,
the packet generator generates second location information for specifying a location where the second data is contained in the packet based on a range in which the second data is stored out of the first memory region, and
the packet generator generates a header including the first location information and the second location information, and the packet contains the header.

5. The transmission device according to claim 1, wherein
the packet generator generates a header including first location information for specifying a location where the first data is contained in the packet and second location information for specifying a location where the second data is contained in the packet, and
the packet contains the header.

6. The transmission device according to claim 1, comprising:
a third writer configured to write the first data to the transmission buffer.

7. The transmission device according to claim 1, wherein the second data is data with a transmission time constraint shorter than that of the first data.

8. The transmission device according to claim 1, comprising:
a transmitter configured to transmit the packet.

9. A movable entity comprising:
a first sensor configured to detect the first data;
a second sensor configured to detect the second data; and
the transmission device according to claim 1.

10. A reception device comprising:
a buffer manager configured to allocate, in a case where a packet containing both first data and second data is received, a first buffer to the packet;
a packet processor configured to write the first data and the second data that are contained in the packet to the first buffer;
a first reader configured to read the first data from the first buffer, and to output the first data to a first application;
a writer configured to read, after the first data is read from the first buffer, the second data from the first buffer, and to write the second data to a reception buffer; and
a second reader configured to read the second data from the reception buffer, and to output the second data to a second application different from the first application,
wherein a time constraint for providing the first data to the first application is shorter than a time constraint for providing the second data to the second application, and
the buffer manager releases the first buffer after the first data is read from the first buffer by the first reader and the second data is read from the first buffer by the writer.

11. A reception device comprising:
a buffer manager configured to allocate, in a case where a packet containing both first data and second data is received, a first buffer to the first data, and to allocate a second buffer to the second data;
a packet processor configured to write the first data to the first buffer, and to write the second data to the second buffer;
a first reader configured to read the first data from the first buffer, and to output the first data to a first application;
a writer configured to read the second data from the second buffer, and to write the second data to a reception buffer; and
a second reader configured to read the second data from the reception buffer, and to output the second data to a second application different from the first application,
wherein a time constraint for providing the first data to the first application is shorter than a time constraint for providing the second data to the second application, and
the buffer manager releases the second buffer after the second data is read from the second buffer by the writer.

12. A transmission method comprising:
reading, from a transmission buffer configured to store first data related to a first application, the first data, writing the first data that is read to a first memory region and holding the written first data in the first memory region until a transmission request of second data is generated;

reading, in a case where the transmission request of the second data related to a second application different from the first application is generated after the first data is written to the first memory region, the first data in the first memory region, and generating a packet containing both the first data and the second data; and transmitting the packet.

\* \* \* \* \*